US007523073B2

(12) United States Patent
Nomura et al.

(10) Patent No.: US 7,523,073 B2
(45) Date of Patent: Apr. 21, 2009

(54) CHARGING METHOD AND CHARGING APPARATUS

(75) Inventors: Takuji Nomura, Yokohama (JP); Kenji Kuwana, Funabashi (JP); Yoichi Utaka, Tokyo (JP); Naoki Takashima, Yokohama (JP); Akio Watanabe, Yokohama (JP); Toshiyuki Tezuka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 765 days.

(21) Appl. No.: 11/078,660

(22) Filed: Mar. 14, 2005

(65) Prior Publication Data

US 2005/0213719 A1    Sep. 29, 2005

(30) Foreign Application Priority Data

Mar. 18, 2004  (JP) .............................. 2004-079278

(51) Int. Cl.
  H04M 11/00   (2006.01)
  G06F 7/00    (2006.01)
  G06F 9/00    (2006.01)
  G07D 1/06    (2006.01)
  H04N 1/32    (2006.01)
  H04N 1/00    (2006.01)
  G06F 19/00   (2006.01)

(52) U.S. Cl. ............. 705/400; 379/100.04; 379/100.06; 379/143; 453/2; 453/17; 358/468; 194/217

(58) Field of Classification Search .................. 705/400; 379/100.04, 100.06, 143; 194/217; 358/468; 453/2, 17
See application file for complete search history.

(56) References Cited

U.S. PATENT DOCUMENTS 4,028,494 A * 6/1977 Zarouni ....................... 379/132
4,956,721 A * 9/1990 Tasaki et al. ................. 358/402
5,184,708 A * 2/1993 Levasseur .................... 194/217
5,265,153 A * 11/1993 Ozawa ..................... 379/100.04
5,835,240 A * 11/1998 Kobayashi et al. ........... 358/468
6,994,202 B1 * 2/2006 Billington et al. ............ 194/217

FOREIGN PATENT DOCUMENTS

| JP | 62-15967    | 1/1987 |
| JP | 63-98280    | 4/1988 |
| JP | 10-023189   | 1/1998 |
| JP | 2001-160875 | 6/2001 |
| JP | 2005-51377  | 2/2005 |

OTHER PUBLICATIONS

"Imagistics Launches Flagship Multifunctional Workgroup Document Solution; 5000 MFP Offers Internet Faxin and 17 Pages-Per-Minute Capabilities", Business Wire, New York: Feb. 11, 2002. Available at: http://proquest.umi.com/pqdweb?index=3&did=106799073&SrchMode=1&sid=9&Fmt=3&VInst=PROD&VTType=PQD&RQT=309&VName=PQD&TS=1229104845&clientID=19649.*

* cited by examiner

Primary Examiner—John W Hayes
Assistant Examiner—Kevin Flynn
(74) Attorney, Agent, or Firm—Morrison & Foerster LLP

(57) ABSTRACT

A method of charging for use of a facsimile apparatus, using an information processing unit provided therein, is disclosed that includes the steps of (a) the information processing unit obtaining the amount of facsimile transmission; (b) the information processing unit obtaining a transmission condition specified by a user; and (c) the information processing unit calculating a charge for the facsimile transmission using the amount of facsimile transmission and a charge corresponding to the transmission condition. The information processing unit stores data on the charge corresponding to the transmission condition for the facsimile transmission.

6 Claims, 12 Drawing Sheets

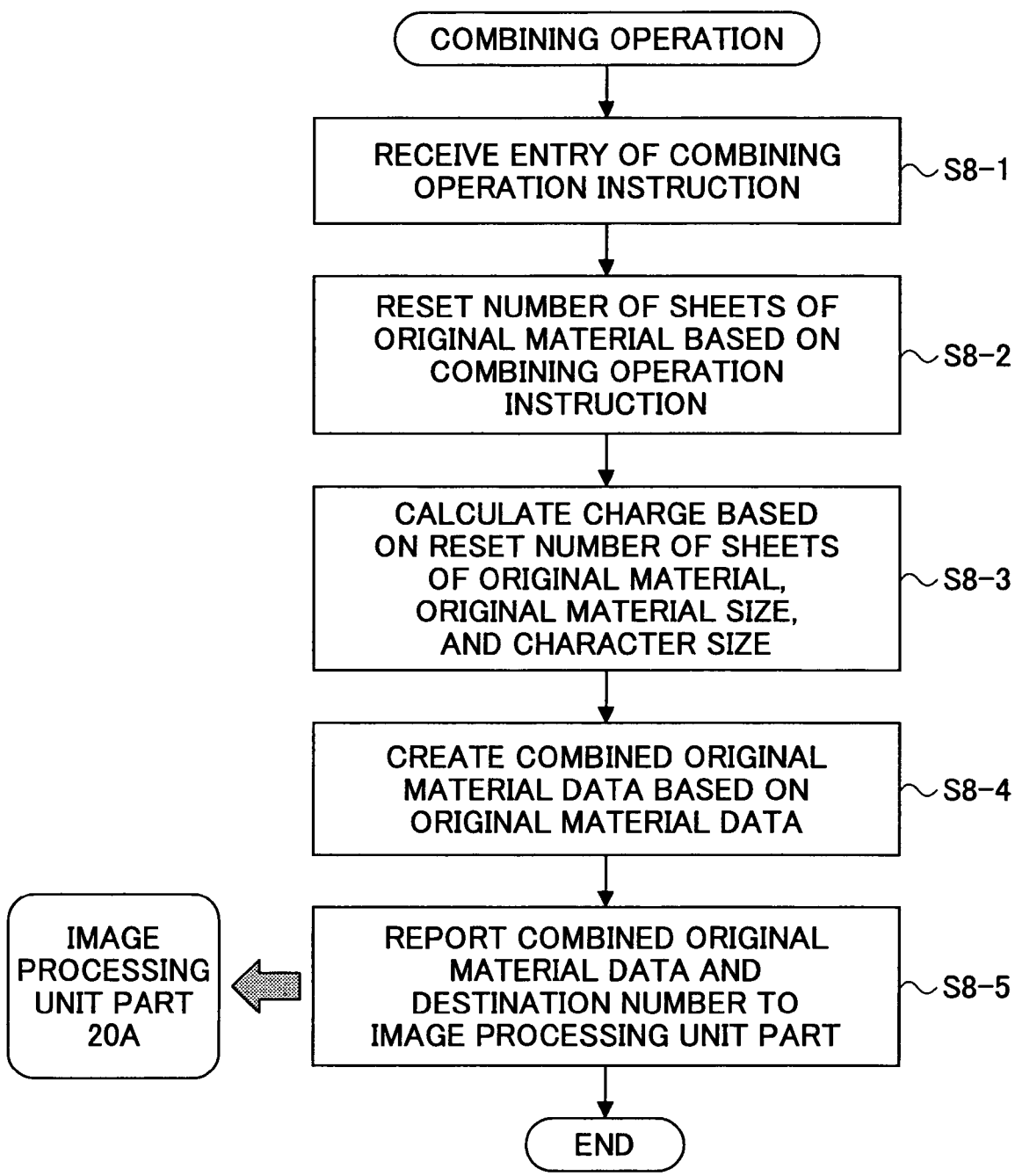

CHARGING METHOD AND CHARGING APPARATUS

BACKGROUND OF THE INVENTION

1. Field of the Invention

The present invention relates generally to charging methods and charging apparatuses, and more particularly to a method and apparatus for charging based on transmission status in facsimile communications.

2. Description of the Related Art

Conventionally, when an image forming apparatus installed in a convenience store is used for, for instance, making a copy, a charge for the copy is collected using a coin rack (coin box). As for charging for use of an image forming apparatus, the charging technique is also disclosed with respect to the case of performing facsimile communications in, for instance, Japanese Laid-Open Patent Application No. 10-23189 (pages 7-10). According to the technique disclosed therein, a communication period of facsimile transmission is measured, and a charge for the facsimile transmission is calculated using the communication period and table data relating to a connection fee corresponding to the communication period.

In the case of facsimile communications, however, it is difficult to estimate a charge based on usage because communications are performed with another apparatus. Accordingly, a uniform charge structure (system) is often employed for charging. However, such a charge structure does not allow a variety of services to be provided to users.

SUMMARY OF THE INVENTION

Accordingly, it is a general object of the present invention to provide a charging method and a charging apparatus in which the above-described disadvantage is eliminated.

A more specific object of the present invention is to provide a charging method and a charging apparatus for charging based on transmission status in the case of facsimile transmission.

The above objects of the present invention are achieved by a method of charging for use of a facsimile apparatus, using an information processing unit provided therein, the method including the steps of: (a) the information processing unit obtaining an amount of facsimile transmission; (b) the information processing unit obtaining a transmission condition specified by a user; and (c) the information processing unit calculating a charge for the facsimile transmission using the amount of the facsimile transmission and a charge corresponding to the transmission condition, wherein the information processing unit stores data on the charge corresponding to the transmission condition for the facsimile transmission.

The above objects of the present invention are also achieved by an apparatus for charging for use of a facsimile apparatus, the apparatus including an information processing unit, the information processing unit including: a transmission amount obtaining part configured to obtain an amount of facsimile transmission; a transmission condition obtaining part configured to obtain a transmission condition specified by a user; a charge storage part configured to store data on a first charge corresponding to the transmission condition for the facsimile transmission; and a charge calculation part configured to calculate a second charge for the facsimile transmission using the amount of the facsimile transmission and the first charge corresponding to the transmission condition, the first charge being extracted from the charge storage part based on the transmission condition.

The above objects of the present invention are also achieved by a computer-readable storage medium storing a program for causing a computer to execute a method of charging for use of a facsimile apparatus, using an information processing unit provided therein, the method including the steps of: (a) the information processing unit obtaining an amount of facsimile transmission; (b) the information processing unit obtaining a transmission condition specified by a user; and (c) the information processing unit calculating a charge for the facsimile transmission using the amount of the facsimile transmission and a charge corresponding to the transmission condition, wherein the information processing unit stores data on the charge corresponding to the transmission condition for the facsimile transmission.

According to the present invention, it is possible to calculate a charge for facsimile transmission using the obtained amount of facsimile transmission and a transmission condition specified by a user. Accordingly, the charge can be calculated with more flexible charge settings, and it is possible to calculate a charge suitable for usage before facsimile transmission. Further, since the amount of facsimile transmission is obtained and used to calculate a charge, it is possible to calculate a charge before actual transmission.

According to the present invention, it is possible to perform charging in accordance with transmission status before performing facsimile transmission.

BRIEF DESCRIPTION OF THE DRAWINGS

Other objects, features and advantages of the present invention will become more apparent from the following detailed description when read in conjunction with the accompanying drawings, in which:

FIG. 14 is a flowchart for illustrating a combining operation according to a fourth modification of the embodiment of the present invention.

DETAILED DESCRIPTION OF THE PREFERRED EMBODIMENTS

A description is given below, with reference to the accompanying drawings, of an embodiment of the present invention.

In this embodiment, the present invention is described as a method, apparatus, and program for charging based on transmission status (a transmission situation) in the case of facsimile transmission.

Figure 1:
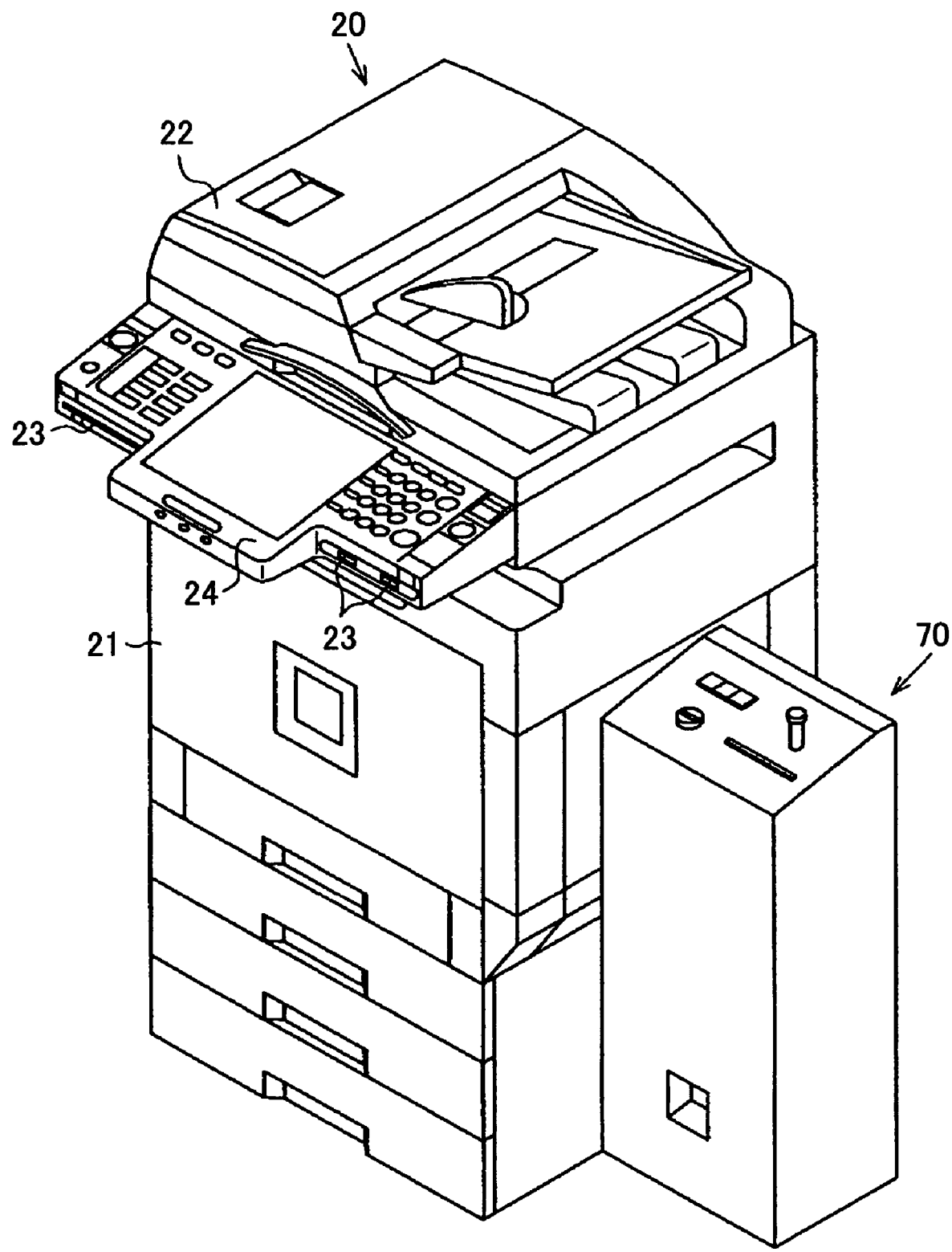
FIG. 1 is a schematic diagram illustrating a system according to an embodiment of the present invention.

FIG. 1 is a schematic diagram illustrating a system according to the embodiment. The system includes an image forming apparatus 20 having a facsimile communication function to function as a facsimile apparatus and a coin rack (coin box) 70 serving as a cash storage part. In this embodiment, this system is installed in, for instance, a convenience store, and in the case of performing a facsimile communication, a charge is collected using the coin rack 70.

As illustrated in FIG. 1, the image forming apparatus 20 is connected to the coin rack 70. Charges may be collected not only in cash collected through the coin rack 70 but also in electronic money through a contact-type or non-contact-type IC card. In this case, the cash storage part has the function of reading out a remaining amount in the IC card, and a charge for use by a user and the remaining amount are compared in response to a command from the image forming apparatus 20. The image forming apparatus 20 and the coin rack 70 form a system for charging for use of the image forming apparatus 20. The image forming apparatus 20 is a multi-function apparatus having printing, copying, scanning, and facsimile communication functions. However, as the image forming apparatus 20, it is sufficient to have the facsimile communication function. Charges for use of these functions are collected using the coin rack 70.

The image forming apparatus 20 includes a printing unit 21 and an image reading unit 22 provided thereon. The printing unit 21 forms an image on a paper medium such as a sheet of paper. The image reading unit 22 reads an image from original material such as a document. An operations panel 24 is provided to an external side of the image reading unit 22. The operations panel 24 displays information to a user and receives various inputs from the user. An external medium input/output unit 23 is provided to the lower part of the operations panel 24. The external medium input/output unit 23 reads data from and/or writes data to various media (recording media). In the external medium input/output unit 23, insertion parts into which recording media are inserted are externally exposed. Here, the recording media include a semiconductor memory, a flexible disk, a hard disk, and an optical disk. The image forming apparatus 20 is provided with the function of the external medium input/output unit 23 reading data from and/or writing data to these recording media.

Figure 2:
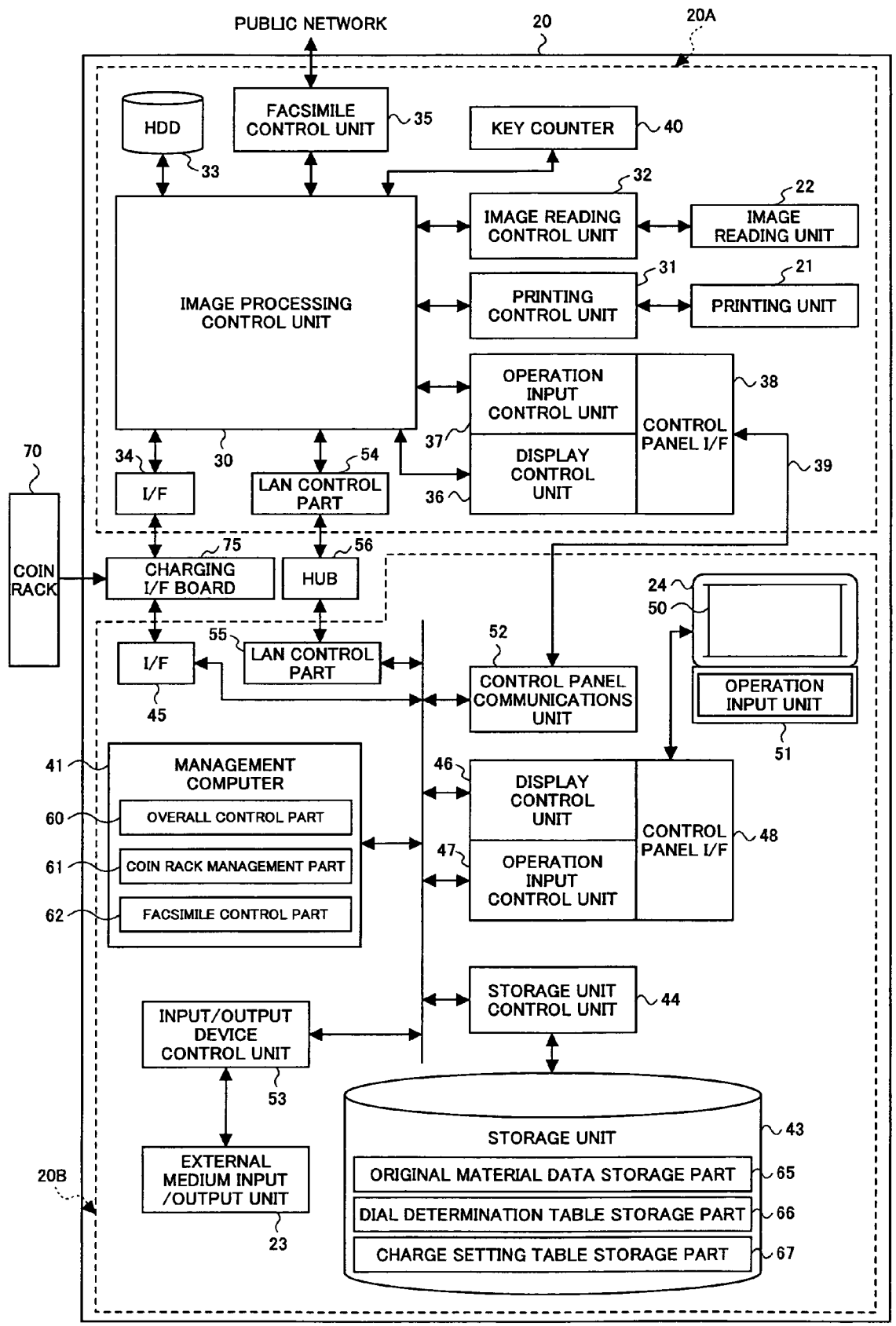
FIG. 2 is a block diagram illustrating electrical connections of each part of an image forming apparatus according to the embodiment of the present invention.

FIG. 2 is a block diagram illustrating electrical connections of each part of the image forming apparatus 20. As illustrated in FIG. 2, the image forming apparatus 20 includes an image processing unit part 20A and an information processing unit part 20B serving as an information processing unit. That is, according to this embodiment, a charging unit (charging apparatus) including an information processing unit is provided inside the image forming apparatus 20. The printing unit 21 and the image reading unit 22 are included in the image processing unit part 20A. On the other hand, the operations panel 24 and the external medium input/output unit 23 are included in the information processing unit part 20B.

A description is given first of the image processing unit part 20A. In addition to the printing unit 21 and the image reading unit 22, the image processing unit part 20A includes an image processing control unit 30 controlling overall image processing in the image processing unit part 20A. A printing control unit 31 controlling the printing unit 21 and an image reading control unit 32 controlling the image reading unit 22 are connected to the image processing control unit 30. If the original material prepared by the user is a paper medium, the original material read by the image reading unit 22 is converted into electronic data to be stored as original material data in an SDRAM (synchronous dynamic random access memory) (not graphically illustrated) inside the image processing control unit 30 or in an original material data storage part (not graphically illustrated) inside an HDD (hard disk drive) 33 through the image processing control unit 30.

The printing control unit 31 outputs a print command including image data to the printing unit 21 in accordance with the control of the image processing control unit 30, thereby causing the printing unit 21 to form an image on the paper medium. The printing unit 21 supports full-color printing. The printing unit 21 may employ various printing methods such as electrophotography, ink-jet printing, sublimation dye transfer printing, silver halide photography, direct thermal recording, and thermofusible transfer.

The image reading control unit 32 drives the image reading unit 22 in accordance with the control of the image processing control unit 30 so as to focus light reflected from the surface of the original material illuminated with a lamp on a light-receiving element such as a charge-coupled device (CCD) through a mirror and a lens, read the light, and perform analog-to-digital conversion on the light, thereby generating 8-bit digital image data of each of R, G, and B.

The image processing control unit 30 has a microcomputer configuration, where a CPU (central processing unit), which is a main processor, the SDRAM, a ROM (read-only memory), and an NVRAM (nonvolatile random access memory) are connected via a bus.

The image processing control unit 30 is connected to the HDD 33. Data such as image data and job history are recorded in the HDD 33. The image processing control unit 30 is connected through an interface (I/F) 34 to a charging I/F board 75 provided inside the image forming apparatus 20. The image processing unit part 20A is connected to the information processing unit part 20B and the coin rack 70 through the charging I/F board 75. The charging I/F board 75 is used to exchange charging-related data among the information processing unit part 20B, the image processing unit part 20A, and the coin rack 70.

The image processing control unit 30 is connected to a LAN control part 54, which is a communications interface for connecting the image processing unit part 20A to a LAN through a hub 56. The image processing unit part 20A receives external printing data and commands such as a print command and a facsimile transmission command through the LAN control part 54.

The image processing control unit 30 is connected to a facsimile control unit 35 performing facsimile control. The facsimile control unit 35 is connected to a public network.

The image processing control unit 30 is connected to a display control unit 36 and an operation input control unit 37.

The display control unit 36 outputs an image display control signal to the information processing unit part 20B through a communication cable 39 connected to a control panel I/F 38 in accordance with the control of the image processing control unit 30. The operations panel 24 of the information processing unit part 20B has its image display controlled by the image display control signal. The operation input control unit 37 inputs an input control signal according to a user's input operation from the operations panel 24 of the information processing unit part 20B through the communication cable 39 connected to the control panel I/F 38 in accordance with the control of the image processing control unit 30. That is, the image processing unit part 20A is configured so as to be able to monitor the operations panel 24 of the information processing unit part 20B directly through the communication cable 39.

That is, the image processing unit part 20A is formed by connecting the communication cable 39 to the image processing unit of the conventional image processing apparatus so as to use the operations panel 24 of the information processing unit part 20B. That is, the display control unit 36 and the operation input control unit 37 of the image processing unit part 20A operate as units connected to the operations panel 24.

The image processing control unit 30 is connected to a key counter 40. The key counter 40 counts the number of paper media on which printing is performed in the image forming apparatus 20.

Next, a description is given of the information processing unit part 20B having the operations panel 24. The information processing unit part 20B has a microcomputer configuration controlled by a general-purpose OS (operating system) used in an information processing apparatus generally referred to as a personal computer. The information processing unit part 20B includes a management computer 41. The management computer 41 includes a CPU, which is a main processor, a RAM serving as a work area for the CPU, and a ROM storing a boot program.

The management computer 41 is connected to a storage unit control unit 44. The storage unit control unit 44 controls inputting of data to and outputting of data from a storage unit 43 such as an HDD storing an OS and application programs. The management computer 41 is connected to an I/F 45, which is a communications interface for connecting the information processing unit part 20B to the image processing unit part 20A and the coin rack 70 through the charging I/F board 75.

The management computer 41 is also connected to a display control unit 46 controlling the operations panel 24 and an operation input control unit 47. The operations panel 24 includes a display unit 50 such as an LCD (liquid crystal display) and an operation input unit 51. The operation input unit 51 includes a touch panel on the surface of the display unit 50 and a keyboard having multiple keys. The keyboard includes a start key for starting image reading or facsimile transmission, a numeric keypad for entering numeric values, and a stop key for stopping an operation. That is, the display control unit 46 outputs an image display control signal to the display unit 50 through a control panel I/F 48 so as to display an image on the display unit 50. On the other hand, the operation input control unit 47 receives an input control signal according to a user's input operation on the operations panel 24 through the control panel I/F 48.

The management computer 41 is also connected to a control panel communications unit 52. The control panel communications unit 52 is connected to the control panel I/F 38 of the image processing unit part 20A through the communication cable 39. The control panel communications unit 52 receives the image display control signal output from the image processing unit part 20A, and transfers the input control signal according to the user's input operation from the operations panel 24 to the image processing unit part 20A. The image display control signal is a signal for controlling information to be displayed on the display unit 50. The input control signal is a signal into which a user's instruction obtained from the operation input unit 51 is converted.

The image display control signal from the image processing unit part 20A received by the control panel communications unit 52 is output to the display control unit 46 after being subjected to data conversion for the display unit 50 of the operations panel 24. The input control signal according to the user's input operation from the operations panel 24 is input to the control panel communications unit 52 after being converted into a data format complying with specifications in the image processing unit part 20A.

The management computer 41 is connected to a LAN control part 55, which is a communications interface for connecting the information processing unit part 20B to the LAN through the hub 56. The LAN control part 55 is assigned an IP address different from that assigned to the above-described LAN control part 54 of the image processing unit part 20A. Thus, the image processing unit part 20A and the information processing unit part 20B are connected to the LAN, being assigned respective IP addresses. Accordingly, data can be exchanged between the image processing unit part 20A and the information processing unit part 20B in the image forming apparatus 20. The image forming apparatus 20 is connected to the LAN through the hub 56. Further, the image processing unit part 20A and the information processing unit part 20B are connectable to a network such as the Internet through the LAN control parts 54 and 55, respectively.

As described above, the storage unit 43 stores the OS and application programs executed by the CPU of the management computer 41 as well as various data. When the image forming apparatus 20 is turned on, the CPU of the management computer 41 starts the boot program stored in the ROM so as to read the OS into the RAM from the storage unit 43 and start the OS. The OS starts programs, reads information, and stores information in accordance with user's operations. A general-purpose OS such as Microsoft Windows® is employed as the OS of the information processing unit part 20B.

As described above, the image forming apparatus 20 according to this embodiment includes the external medium input/output unit 23 that reads data from and/or writes data to a recording medium. The external medium input/output unit 23 is controlled by an input/output device control unit 53 connected to the management computer 41. Further, a speech output unit (not graphically illustrated) is connected to the management computer 41 in the information processing unit part 20B.

The management computer 41 includes an overall control part 60, a coin rack management part 61, and a facsimile control part 62.

The overall control part 60 performs processing for collecting and retaining information necessary for the management computer 41 to perform various operations, and performs processing for performing coordinated control of the functions by the respective parts.

The coin rack management part 61 performs processing for managing the state inside the coin rack 70 and controlling the coin rack 70 to perform a settlement operation.

The facsimile control part 62 performs processing for giving the image processing unit part 20A instructions relating to facsimile communications. The facsimile control part 62 may also process data on the original material (original material data) to be faxed (transmitted by facsimile). For instance, the original material data is read out and processed in a below-described operation by N-up selection.

The management computer 41 performs below-described processing with these parts. By executing a charging program therefor, the management computer 41 functions as a transmission amount obtaining part, a transmission condition obtaining part, and a charge calculation part.

The storage unit 43 includes an original material data storage part 65, a dial determination table storage part 66, and a charge setting table storage part 67 as a charge storage part.

The original material data storage part 65 temporarily stores read data on the original material to be communicated by facsimile. The original material data may be read optically by the image reading unit 22. The original material data may also be software-created electronic data read using the external medium input/output unit 23. When the facsimile communication is completed, the original material data recorded in the original material data storage part 65 is deleted by writing random data. Specifically, writing random data refers to writing data composed of figures and symbols that make no sense over the physical area of the storage unit 43 to which the original material data has been written. This makes it impossible to recover the original material data even with commercially available recovery software. As a result, it is possible to prevent leakage of personal information.

In the dial determination table storage part 66, a variety of dial determination tables for determining a destination facsimile number input by a user is recorded. According to this embodiment, the dial determination tables are preset at the time of shipment of the image forming apparatus 20. The dial determination tables are updated by settings input from the operations panel 24 or downloaded from an external server.

Figure 3:
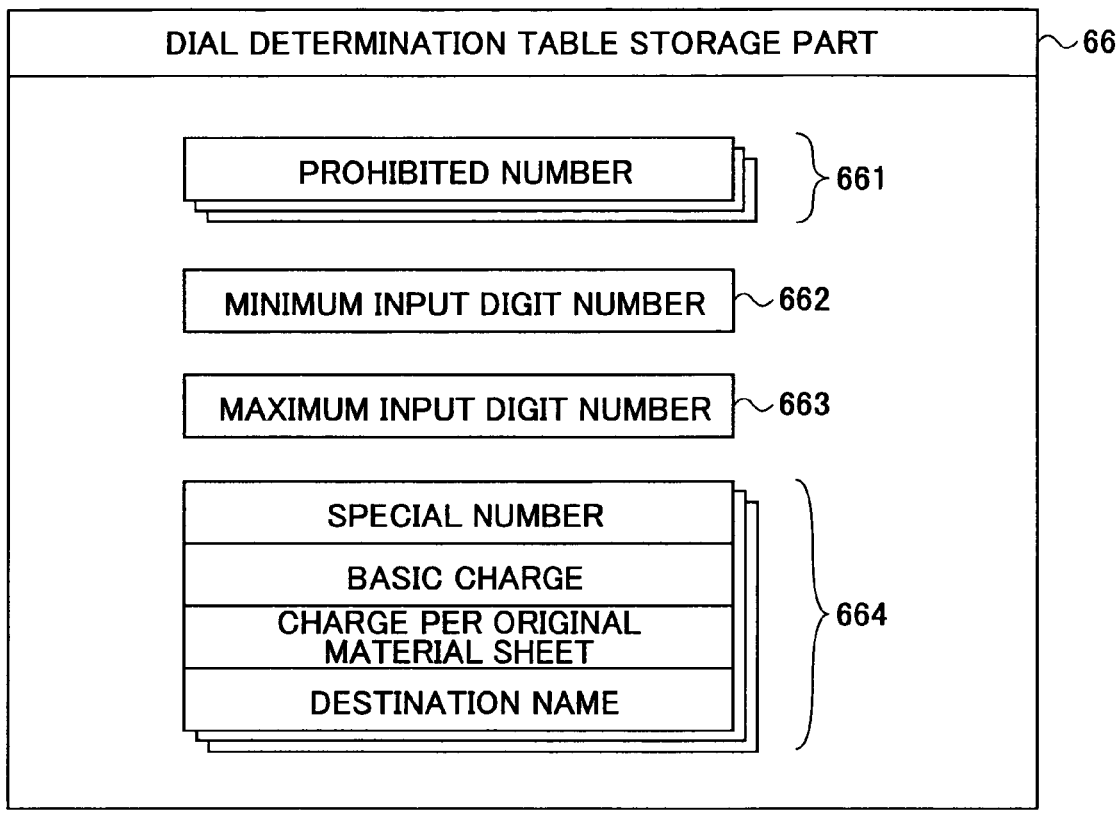
FIG. 3 is a diagram for illustrating data stored in a dial determination table storage part according to the embodiment of the present invention.

FIG. 3 is a diagram for illustrating data stored in the dial determination table storage part 66. As illustrated in FIG. 3, prohibited number tables formed of prohibited number data 661, minimum input digit number data 662, maximum input digit number data 663, and special number tables formed of special number data 664 are recorded in the dial determination table storage part 66.

As the prohibited number data 661, data on a predetermined first few digits of each facsimile number that is not allowed to be used as a destination facsimile number is recorded. Specifically, for instance, "0120," "0990," and "0110" are set as prohibited numbers.

As the minimum input digit number data 662, data on a minimum number of digits allowed to be used as a destination facsimile number is recorded. Specifically, for instance, "four" is set as a minimum number of input digits in order to prevent numbers such as "110" and "119" from being specified as destinations of transmission.

As the maximum input digit number data 663, data on a maximum number of digits allowed to be used as a destination facsimile number is recorded. According to this embodiment, for instance, overseas facsimile communications using the image forming apparatus 20 are prohibited. Therefore, according to this embodiment, "eleven" is set as a maximum number of input digits in order to exclude the facsimile numbers of overseas designations of transmission.

The special number data 664 is data on charge settings for the case of performing facsimile communications with specific destinations (special numbers). Each special number table is formed of the corresponding special number data 664. According to this embodiment, the special number data 664 includes data on special numbers, basic charges, charges per sheet of original material (original material sheet), and destination names.

In the special number data area of each table, data on a specific facsimile number is recorded as the special number.

In the basic charge data area of each table, data on a basic charge in the case of performing a facsimile communication with the special number specified as a destination is recorded.

In the charge-per-original-material-sheet data area of each table, data on a charge added per (sheet of) original material in the case of performing a facsimile communication with the special number specified as a destination is recorded.

In the destination name data area of each table, data on the name of the destination corresponding to the special number is recorded.

Figure 4:
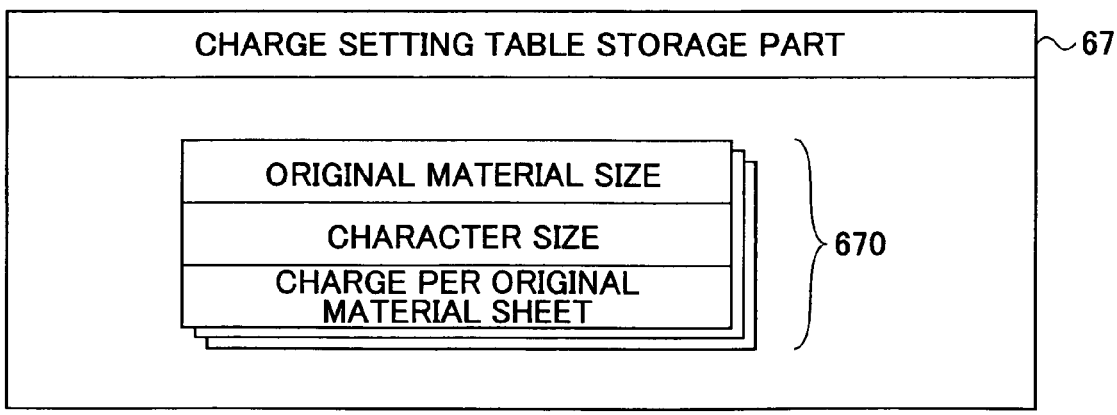
FIG. 4 is a diagram for illustrating data stored in a charge setting table storage part according to the embodiment of the present invention.

FIG. 4 is a diagram for illustrating data stored in the charge setting table storage part 67. As illustrated in FIG. 4, in the charge setting table storage part 67, charge setting tables formed of charge setting data 670 used to calculate a charge (an amount to be charged) when the facsimile communications function is used are recorded. According to this embodiment, the charge setting tables are preset at the time of shipment of the image forming apparatus 20. Further, the charge setting tables are updated by settings input from the operations panel 24 or downloaded from an external server.

The charge setting data 670 is data on charges corresponding to facsimile communications conditions. Each charge setting table is formed of the corresponding charge setting data 670. According to this embodiment, the charge setting data 670 includes data on original material (sheet) size, character size, and charge per original material sheet.

In the original material size data area of each table, data on the sheet size of the original material is recorded. Specifically, data indicating "A3," "B4," "A4," or the like is recorded.

In the character size data area of each table, data on a character size is recorded. Specifically, either "normal print" or "small print" is recorded as the character size. According to this embodiment, resolution is determined based on this character size.

In the charge-per-original-material-sheet data area of each table, data on a charge per original material sheet in accordance with the original material size and the character size is recorded.

The coin rack 70 is an apparatus for receiving a charge for use of the image forming apparatus 20 in the case of charging therefor. The coin rack 70 stores cash usable as change and cash put in or deposited by a user.

Thus, the image processing unit part 20A forms an image on a medium such as a paper sheet, and performs facsimile communications. Meanwhile, the information processing unit part 20B performs a variety of information processing operations, and performs centralized control of the image processing unit part 20A and each part of the information processing unit part 20B. The image forming apparatus 20, including the image processing unit part 20A, the information processing unit part 20B, and the charging I/F board 75, and the coin rack 70 form a charging system.

A description is given, with reference to FIGS. 5 through 9, of an operations procedure in the case of charging for facsimile transmission using the system configured as described above. In the following, the operations procedure is divided into a facsimile setting operation (FIG. 5), a change check operation (FIG. 6), a pre-transmission charging confirmation operation (FIG. 7), a facsimile transmission operation (FIG. 8), and a failure-time charging operation (FIG. 9); and a description is given of each of the divided operations.

[Facsimile Setting Operation]

Figure 5:
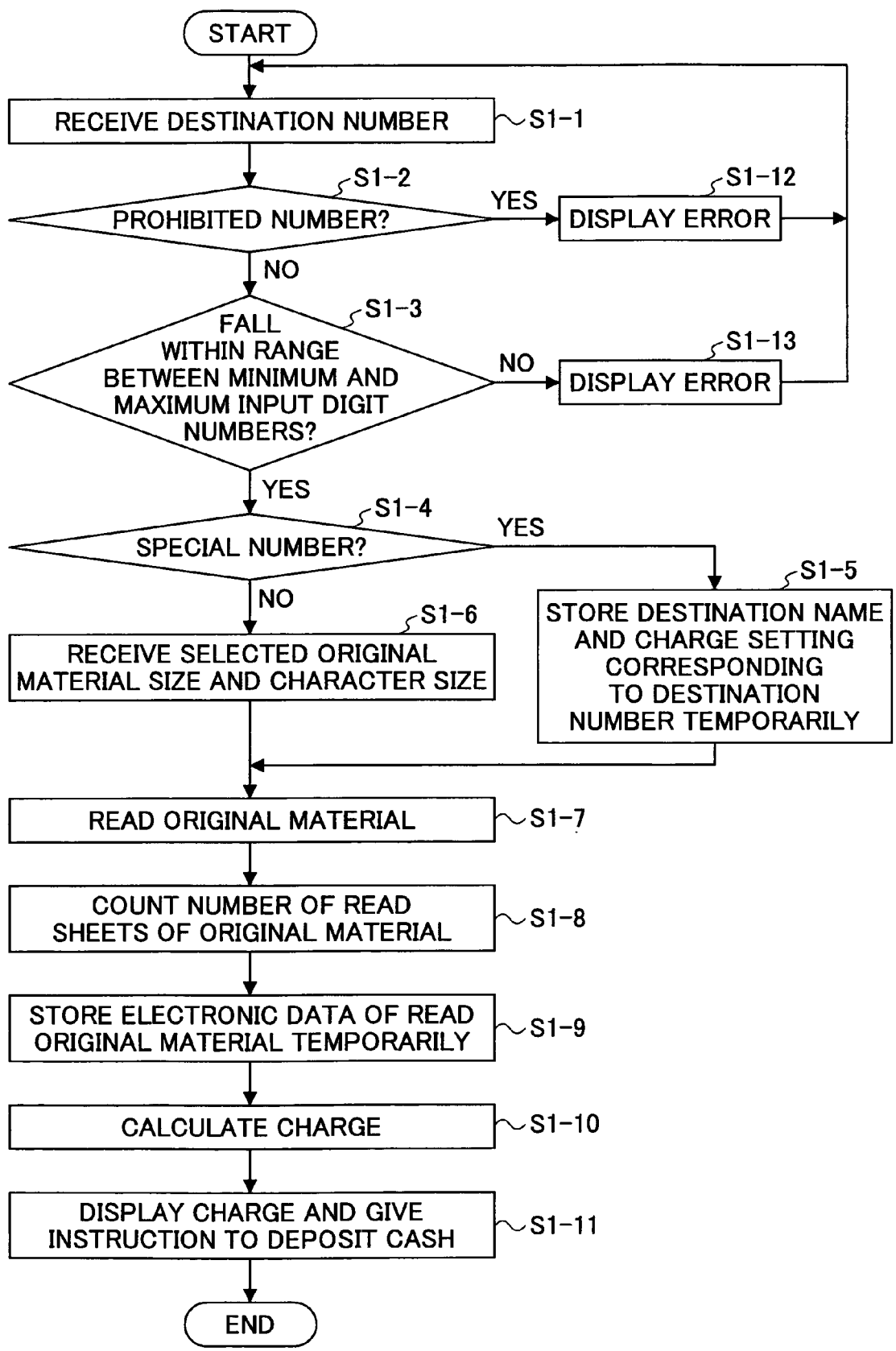
FIG. 5 is a flowchart for illustrating a facsimile setting operation according to the embodiment of the present invention.

First, a description is given, with reference to FIG. 5, of the facsimile setting operation. In this facsimile setting operation, the facsimile number of a destination of transmission entered (input) by a user is set, while original material is read so that a charge to be collected is calculated and presented to the user.

In an attempt to fax prepared paper original material, first, a user enters the facsimile number of a destination of transmission using the operation input unit 51 of the operations panel 24 of the image forming apparatus 20. As a result, data on the entered facsimile number of the destination is transmitted to the management computer 41. Then, in step S1-1, the overall control part 60 of the management computer 41 receives the facsimile number of the destination (destination number). The overall control part 60 notifies the facsimile control part 62 of the received destination number.

In step S1-2, the facsimile control part 62 determines whether the destination number is a prohibited number. Specifically, the facsimile control part 62 collates the received destination number with the prohibited numbers set in the prohibited number data 661. If the predetermined first few digits of the destination number match none of the prohibited numbers set in the prohibited number data 661 (NO in step S1-2), the destination number is not a prohibited number. Meanwhile, if the predetermined first few digits of the destination number match any of the prohibited numbers set in the prohibited number data 661 (YES in step S1-2), the destination number is a prohibited number. If the destination number is a prohibited number, in step S1-12, the overall control part 60 displays an error message on the display unit 50, indicating that the destination number is a prohibited number. In this case, the user is allowed to enter another destination number. The management computer 41 reperforms the operation from step S1-1 based on the entered destination number.

If the destination number is not a prohibited number (NO in step S1-2), in step S1-3, the overall control part 60 determines whether the destination number falls within the range between the minimum input digit number and the maximum input digit number. Specifically, the overall control part 60 counts the number of digits of the entered destination number. Then, the overall control part 60 extracts the minimum input digit number data 662 and the maximum input digit number data 663 from the dial determination table storage part 66, and determines whether the number of digits of the entered destination number is greater than or equal to the minimum input digit number and is less than or equal to the maximum input digit number. If the number of digits of the entered destination number does not fall within the range between the minimum input digit number and the maximum input digit number (NO in step S1-3), the overall control part 60 displays an error message on the display unit 50, indicating that the destination number is wrong. In this case, the user is allowed to enter another destination number. The management computer 41 reperforms the operation from step S1-1 based on the entered destination number.

If the number of digits of the entered destination number falls within the range between the minimum input digit number and the maximum input digit number (YES in step S1-3), in step S1-4, the overall control part 60 determines whether the destination number is a special number. Specifically, the overall control part 60 collates the destination number with the special numbers of the special number data 664 of the dial determination table storage part 66. If the destination number matches any of the special numbers of the special number data 664, the destination number is a special number. If the destination number is a special number (YES in step S1-4), in step S1-5, the overall control part 60 temporarily stores a destination name and a charge setting corresponding to the destination number. Specifically, the overall control part 60 extracts the special number data 664 of the special number matching the destination number from the dial determination table storage part 66, and temporarily stores the extracted special number data 664. In this case, the management computer 41 proceeds to the operation of step S1-7.

If the destination number is not a special number (NO in step S1-4), in step S1-6, the overall control part 60 receives an original material size (sheet size) and a character size selected by the user. Specifically, the overall control part 60 displays a screen for selecting an original material size (sheet size) suitable for the original material to be transmitted. On this original material size selection screen, an icon for selecting an original material size is displayed for each selectable original material size. In each icon, an original material size such as "A4," "A3," or "B4" is shown. Below each icon, the length and width and the charge per sheet in facsimile transmission of the corresponding original material size are displayed. The charge per sheet is a charge in the case of selecting "normal print" as a character size, and is displayed based on the data on a charge per original material sheet of the charge setting data 670 specified by the original material size and the character size. By pressing one of the icons, the corresponding original material size is selected, and data on the selected original material size is transmitted to the management computer 41.

With respect to the character size, "normal print" is set as a default. If the user performs no input operation, "normal print" is selected as the character size. In the case of transmitting original material with minute letters or characters, it is necessary to employ high resolution. Accordingly, the user selects "small print" as the character size. Specifically, on a screen displayed on the display unit 50, the user performs an input operation for requesting display of a screen for selecting a character size. As a result, a request to display the character size selection screen is transmitted to the management computer 41. The overall control part 60 displays the character size selection screen on the display unit 50.

On this character size selection screen, icons for "normal print" and "small print" are displayed. Below each icon, a charge per original material sheet in the case of performing facsimile transmission using a resolution corresponding to the corresponding character size is displayed with respect to each original material size (sheet size). This charge per original material sheet is displayed based on the data on a charge per original material sheet of the charge setting data 670 specified by the original material size and the character size. By pressing one of the icons, the corresponding character size is selected, and data on the selected character size is transmitted to the management computer 41.

The overall control part 60 of the management computer 41 receives the data on the original material size and the data on the character size. Then, the overall control part 60 notifies the facsimile control part 62 of the received original material size and character size.

Next, in step S1-7, the management computer 41 reads the original material. Specifically, the management computer 41 causes an original material reading screen to be displayed on the display unit 50. The original material reading screen displays guidance for operations for reading the original material. In addition to the guidance made up of messages and images, a reading start button for starting reading is provided on the original material reading screen. In accordance with the guidance, the user sets the original material in the image reading unit 22, and presses the reading start button. As a result, reading start request data is transmitted to the management computer 41. The facsimile control part 62 of the management computer 41 receiving the reading start request data requests the image processing control unit 30, through the LAN control part 55 and the hub 56, to issue a command to read the original material. The image processing control unit 30 controls the image reading control unit 32 so that the image reading unit 22 reads the original material.

At this point, in step S1-8, the facsimile control part 62 counts the number of read sheets of the original material. Specifically, the facsimile control part 62 instructs the image processing control unit 30 to count the number of read sheets of the original material. The image processing control unit 30 controls the image reading control unit 32 so as to count the number of read sheets of the original material, and notifies the facsimile control part 62 of the number of read sheets. As a result, the number of read sheets of the original material serving as the amount of facsimile transmission is obtained.

In step S1-9, the image processing control unit 30 temporarily stores the electronic data of the read original material in the original material data storage part (not graphically illustrated) of the HDD 33 or in the SDRAM. Then, the image processing control unit 30 notifies the facsimile control part 62 of the temporary storage of the electronic data of the original material. If the original material is electronic data created by software as described below, the overall control part 60 temporarily stores the electronic data of the original material in the original material storage part 65. Then, the overall control part 60 notifies the facsimile control part 62 of the temporary storage of the electronic data of the original material.

Receiving this notification, in step S1-10, the facsimile control part 62 calculates a charge. Specifically, if the destination number is not a special number, the facsimile control part 62 extracts the charge setting data 670 based on the original material size and the character size corresponding to a transmission condition, and calculates a charge based on the charge per original material sheet of the extracted charge setting data 670 and the number of read sheets of the original material. If the destination number is a special number, the facsimile control part 62 extracts the special number data 664 based on the destination number (special number), and calculates a charge using the basic charge and the charge per original material sheet of the extracted special number data 664. Here, the facsimile control part 62 adds the basic charge to the charge calculated using the number of read sheets of the original material and the charge per original material sheet.

In step S1-11, the overall control part 60 displays the determined charge on the display unit 50, and gives an instruction to deposit the charged amount.

[Change Check Operation]

In accordance with the instruction to deposit the charged amount given in step S1-11 of FIG. 5, the user deposits cash in the coin rack 70. Then, the information processing unit part 20B determines whether an exact-amount-only state occurs in the case of performing charging using the cash deposited in the coin rack 70 by the user. The exact-amount-only state refers to a state where there is not enough change left in the coin rack 70. In this case, in order to prevent the occurrence of the exact-amount-only state also in the case of interruption of facsimile transmission, the information processing unit part 20B determines whether the exact-amount-only state occurs with respect to each number of sheets. A description is given of this operation with reference to FIG. 6.

First, the overall control part 60 of the management computer 41 reports the charge determined as described above with respect to the original material to be faxed to the coin rack management part 61, and instructs the coin rack management part 61 to determine whether the exact-amount-only state occurs. Further, the overall control part 60 of the management computer 41 reports to the coin rack management part 61 a charge calculated in the same manner as described above with respect to each number of sheets less than the total number of sheets of the original material to be faxed, and instructs the coin rack management part 61 to determine whether the exact-amount-only state occurs with respect to each number of sheets.

Figure 6:
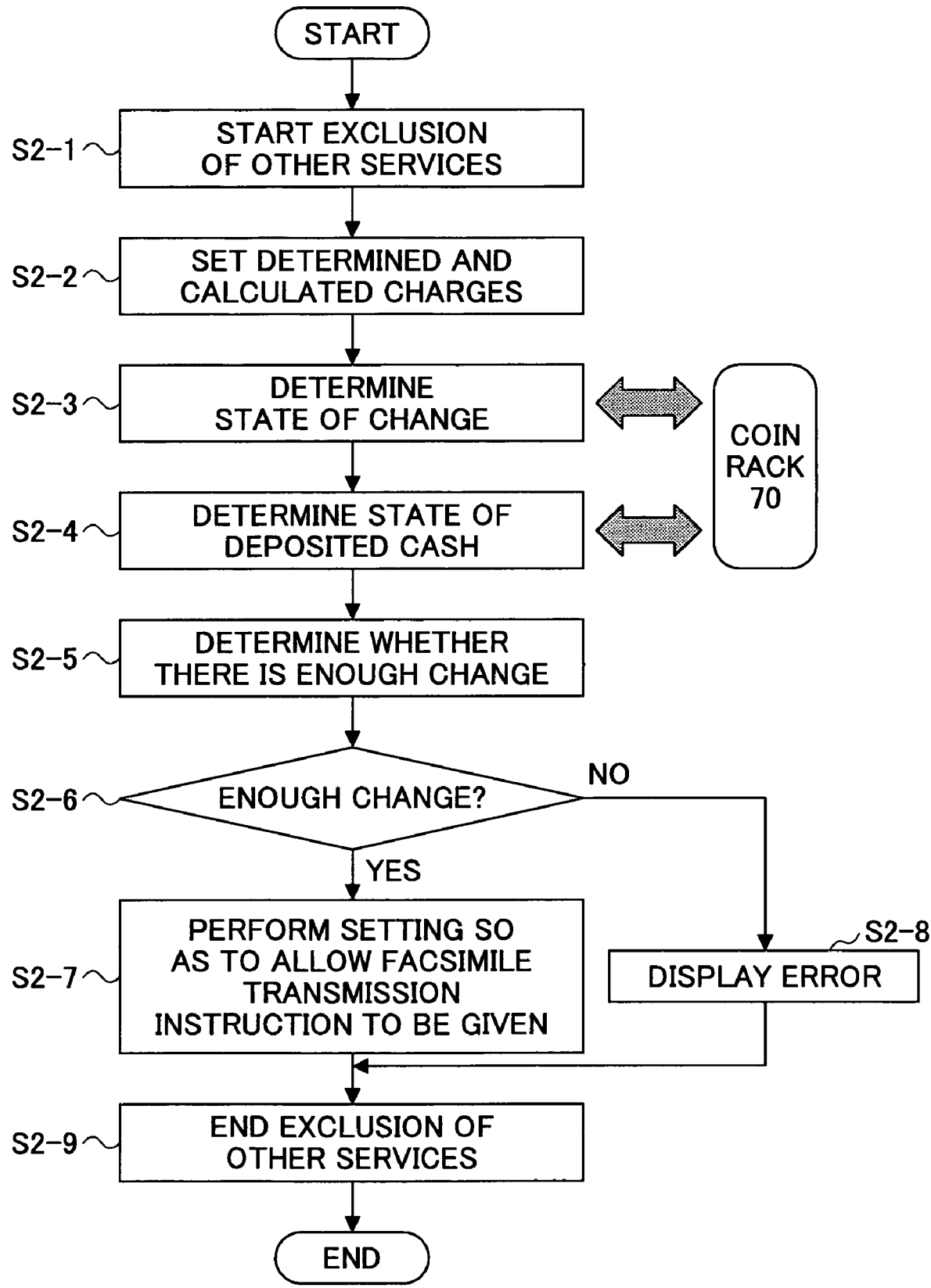
FIG. 6 is a flowchart for illustrating a change check operation according to the embodiment of the present invention.

Receiving this notification, in step S2-1 of FIG. 6, the coin rack management part 61 starts exclusion of other services. As a result, the coin rack management part 61 stops receiving requests for other services.

Next, in step S2-2, the coin rack management part 61 sets each charge reported from the overall control part 60 in order to determine whether the exact-amount-only state occurs. Specifically, the coin rack management part 61 temporarily stores the charge with respect to each of the numbers of sheets (including the total number of sheets of the original material to be faxed) reported from the overall control part 60 in order to determine whether the exact-amount-only state occurs.

Then, in step S2-3, the coin rack management part 61 determines the state of the coin rack 70 through the charging I/F board 75. Specifically, first, the coin rack management part 61 determines the state of the coin rack 70, that is, determines the state of change provided in the coin rack 70. Next, in step S2-4, the coin rack management part 61 determines the state of the cash deposited in the coin rack 70 by the user.

Then, in step S2-5, the coin rack management part 61 determines whether there is enough change based on cash for change stored in the coin rack 70 and the cash deposited therein by the user. In this case, the coin rack management part 61 determines whether there is enough change with respect to the charge calculated with respect to each number of sheets. That is, the coin rack management part 61 determines beforehand whether the exact-amount-only state occurs with respect to the case of interruption of facsimile transmission as well as the case of completion of facsimile transmission. Then, the coin rack management part 61 notifies the overall control part 60 of the results of the determination as to the sufficiency of change.

If there is enough change (YES in step S2-6), in step S2-7, the overall control part 60 performs setting so that the user can give an instruction to perform facsimile transmission. In this case, on the display unit 50, the overall control part 60 displays guidance for giving the facsimile transmission instruction by pressing the start key. Further, the overall control part 60 sets the start key in a pressable state.

On the other hand, if there is not enough change (NO in step S2-6), in step S2-8, the overall control part 60 displays an error message on the display unit 50, and performs setting so as to prevent a facsimile transmission instruction from being given.

In step S2-9, the coin rack management part 61 ends exclusion of other services with respect to the image forming apparatus 20. As a result, the image forming apparatus 20 is released so as to receive requests for other services.

[Pre-transmission Charging Confirmation Operation]

When the guidance for giving the facsimile transmission instruction by pressing the start key is displayed on the display unit 50, the user presses the start key, following this guidance. When the start key is pressed, a notification concerning entry of the facsimile transmission instruction is transmitted to the management computer 41. Receiving this notification, the management computer 41 performs the pre-transmission charging confirmation operation. A description is given of this operation with reference to FIG. 7.

Figure 7:
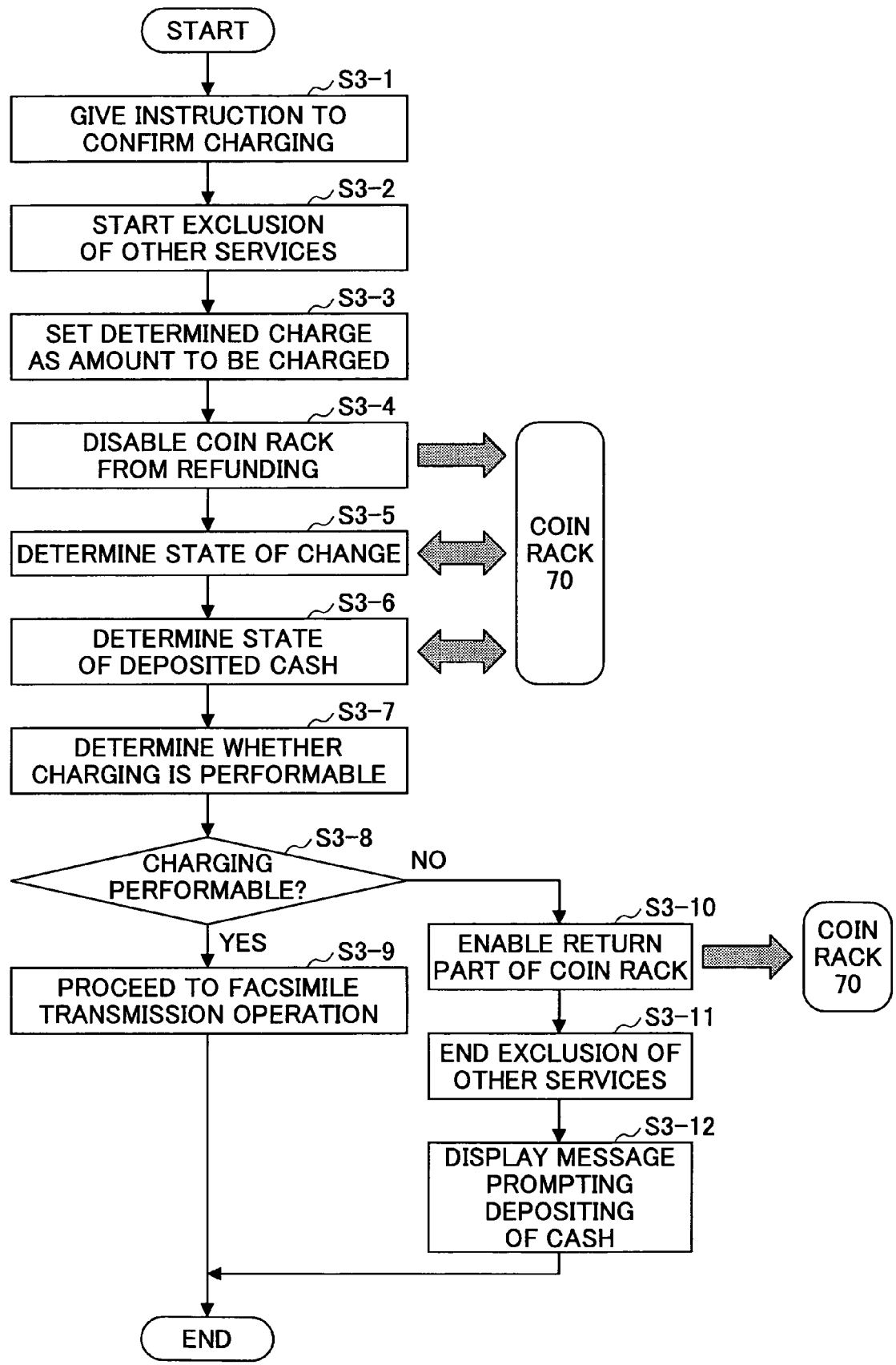
FIG. 7 is a flowchart for illustrating a pre-transmission charging confirmation operation according to the embodiment of the present invention.

Receiving the facsimile transmission instruction from the user, in step S3-1 of FIG. 7, the overall control part 60 instructs the coin rack management part 61 to confirm charging. Receiving this charging confirmation instruction, in step S3-2, the coin rack management part 61 starts exclusion of other services with respect to the image forming apparatus 20. As a result, the image forming apparatus 20 stops receiving requests for other services. Then, in step S3-3, the coin rack management part 61 sets the charge reported from the overall control part 60 as an amount to be charged.

Next, in step S3-4, through the charging I/F board 75, the coin rack management part 61 disables the coin rack 70 from refunding. Then, the coin rack management part 61 determines the state of the coin rack 70 through the charging I/F board 75. Specifically, first, in step S3-5, the coin rack management part 61 determines the state of the cash provided in the coin rack 70. Next, in step S3-6, the coin rack management part 61 determines the state of the cash deposited in the coin rack 70 by the user. Then, in step S3-7, the coin rack management part 61 determines from the state of the coin rack 70 whether charging is performable, and notifies the overall control part 60 of the result of the determination.

If charging is performable (YES in step S3-8), in step S3-9, the overall control part 60 proceeds to the facsimile transmission operation, which is described below with reference to FIG. 8.

If charging is not performable (NO in step S3-8), in step S3-10, the coin rack management part 61 enables the return part (return lever in this case) of the coin rack 70 through the charging I/F board 75. As a result, the user can have the cash deposited in the coin rack 70 returned using the return lever. Then, in step S3-11, the coin rack management part 61 ends exclusion of other services with respect to the image forming apparatus 20. As a result, the image forming apparatus 20 is released so as to be able to receive requests for other services. In step S3-12, the overall control part 60 displays a message prompting depositing of cash on the display unit 50. Step S3-12 is followed by the operation of step S1-10 of FIG. 5.

[Facsimile Transmission Operation]

Figure 8:
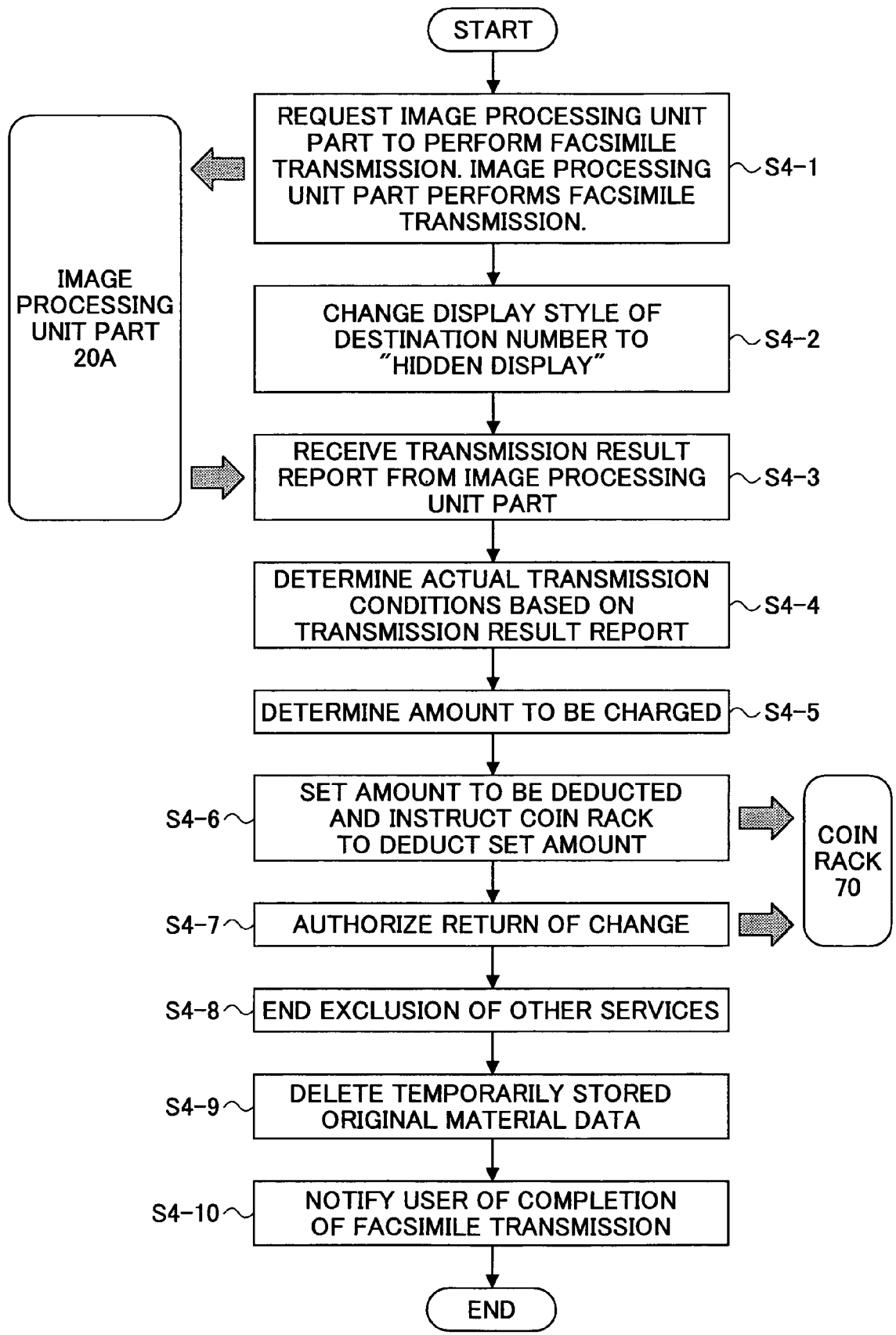
FIG. 8 is a flowchart for illustrating a facsimile transmission operation according to the embodiment of the present invention.

Next, a description is given, with reference to FIG. 8, of the facsimile transmission operation.

First, in step S4-1 of FIG. 8, the overall control part 60 transmits a request for facsimile transmission (a facsimile transmission request) to the image processing unit part 20A through the facsimile control part 62. Then, in step S4-2, the overall control part 60 changes the display style of the destination number displayed on the display unit 50 to "hidden display." Specifically, the overall control part 60 replaces the destination number with asterisks in displaying the destination number on the display unit 50. A display request button for displaying the destination number is provided on the display screen of the display unit 50. When the display request button is pressed, the destination number is redisplayed.

Receiving a facsimile transmission job, the image processing unit part 20A reads out the original material data corresponding to the facsimile transmission request from the HDD 33 where the original material data is temporarily stored, and performs facsimile transmission with the specified conditions.

If the original material data is stored in the storage unit 43, the overall control part 60 transmits information to be faxed (a facsimile transmission job) to the image processing unit part 20A through the facsimile control part 62. Here, the facsimile transmission job includes the original material data to be transmitted and the facsimile transmission request.

When the facsimile transmission is completed, the image processing unit part 20A transmits a transmission result report to the information processing unit part 20B. The transmission result report contains data on a communication state indicating a normal end or data on a communication state in the case of an abnormal end such as error failure, no response, busy line, or disabled connection. The transmission result report also contains data on the number of sheets actually transmitted.

Here, a description is given of a case where the facsimile transmission ends normally. A case where the facsimile transmission ends abnormally is described below with reference to FIG. 9.

In step S4-3, receiving a transmission result report containing data on the normal-end communication state and the number of sheets actually transmitted, the facsimile control part 62 notifies the overall control part 60 of reception of the transmission result report. In step S4-4, receiving this notification, the overall control part 60 determines the actual facsimile transmission status in accordance with the transmission result report, and in step S4-5, determines an amount to be charged. Specifically, the overall control part 60 calculates the amount to be charged in the same manner as in step S1-10 of FIG. 5, using the number of sheets actually transmitted contained in the transmission result report. Then, the overall control part 60 notifies the coin rack management part 61 of the amount to be charged.

In step S4-6, receiving this notification, the coin rack management part 61 sets an amount to be deducted, and instructs the coin rack 70, through the charging I/F board 75, to deduct the set amount. As a result, the coin rack 70 deducts the set amount. In step S4-7, the coin rack management part 61 authorizes the coin rack 70, through the charging I/F board 75, to return change. As a result, the user can have change returned in the coin rack 70.

In step S4-8, the coin rack management part 61 ends exclusion of other services with respect to the image forming apparatus 20. As a result, the image forming apparatus 20 is released so as to be able to receive requests for other services. Then, the coin rack management part 61 notifies the overall control part 60 of completion of charging in the coin rack 70.

In step S4-9, receiving this notification, the overall control part 60 instructs the image processing control unit 30 to delete the original material data stored temporarily in the HDD 33. Alternatively, the overall control part 60 receiving this notification deletes the original material data stored temporarily in the original data storage part 65. Specifically, the image processing control unit 30 deletes the original material data by writing a random symbol string over a physical area in which the original material data is stored in the HDD 33. The overall control part 60 deletes the original material data by writing random data in the original data storage part 65. Then, in step S4-10, the overall control part 60 notifies the user of completion of facsimile transmission. Specifically, the overall control part 60 displays on the display unit 50 a message for notifying the user of completion of facsimile transmission and cautioning the user about leaving behind change.

[Failure-time Charging Operation]

Figure 9:
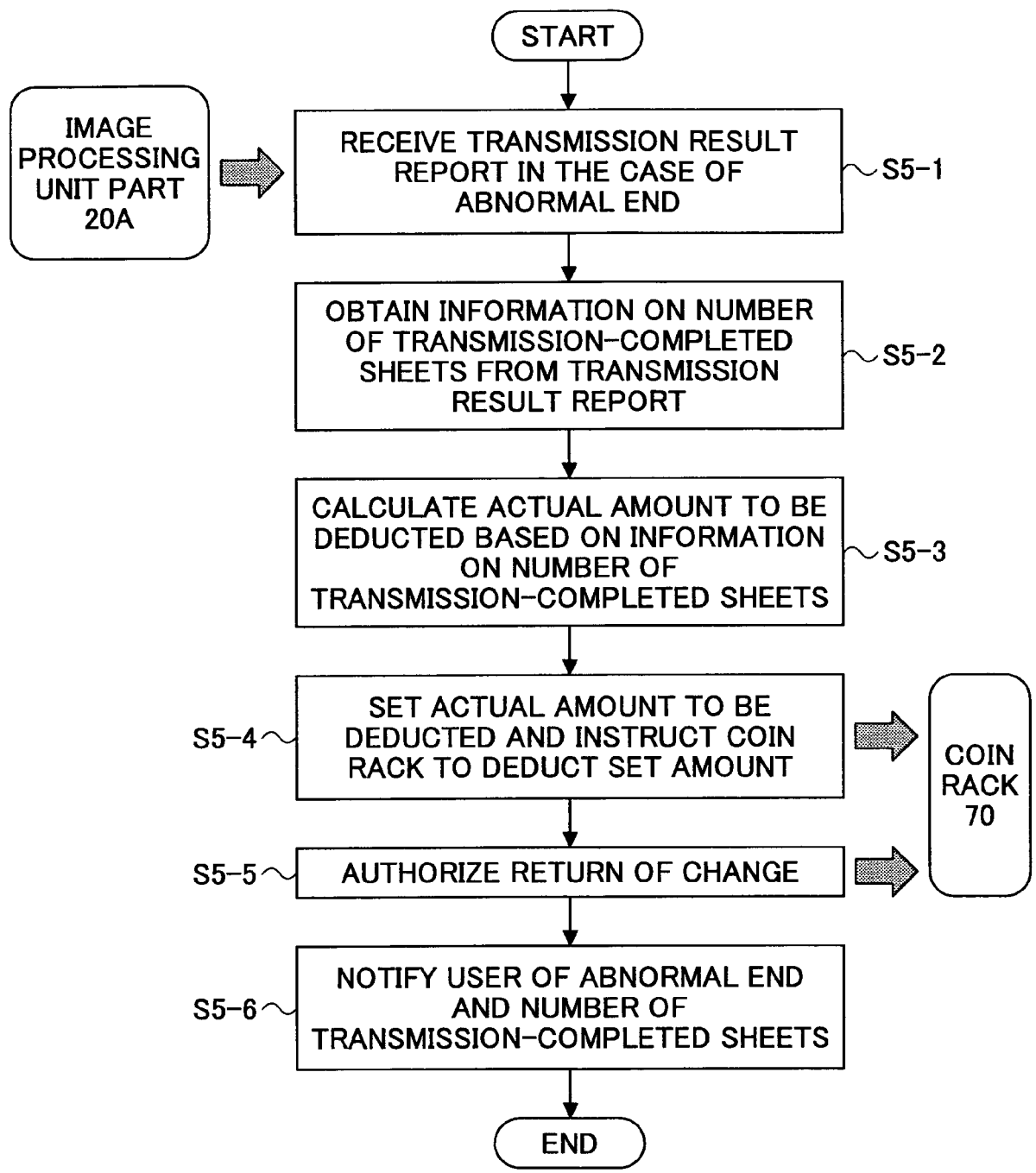
FIG. 9 is a flowchart for illustrating a failure-time charging operation according to the embodiment of the present invention.

A description is given, with reference to FIG. 9, of a charging operation in a case where facsimile transmission ends abnormally.

As illustrated in FIG. 9, if facsimile transmission ends abnormally, the image processing unit part 20A transmits a transmission result report indicating an abnormal end to the information processing unit part 20B. As described above, this transmission result report contains data on a communication state in the case of an abnormal end such as error failure, no response, busy line, or disabled connection, and data on the number of sheets actually transmitted. In step S5-1 of FIG. 9, the management computer 41 receives this transmission result report.

In step S5-2, the facsimile control part 62 of the management computer 41 analyzes the transmission result report, and obtains data on the number of actually transmitted sheets. Then, in step S5-3, the facsimile control part 62 calculates an actual amount to be deducted based on the number of actually transmitted sheets. Specifically, the facsimile control part 62 extracts a charge per original material sheet from the charge setting table storage part 67 based on the temporarily stored original material size and character size. Then, the facsimile control part 62 calculates an actual amount to be deducted using the charge per original material sheet and the number of actually transmitted sheets. The facsimile control part 62 notifies the overall control part 60 of the calculated actual amount to be deducted.

The overall control part 60 notifies the coin rack management part 61 of the actual amount to be deducted. Then, in step S5-4, receiving this notification, the coin rack management part 61 sets the calculated actual amount to be deducted, and instructs the coin rack 70, through the charging I/F board 75, to deduct the set amount. As a result, the coin rack 70 deducts the set actual amount to be deducted. Further, in step S5-5, the coin rack management part 61 authorizes the coin rack 70, through the charging I/F board 75, to return change. As a result, the user can have change returned in the coin rack 70.

In step S5-6, the overall control part 60 notifies the user of the abnormal end and the number of actually transmitted sheets by causing a message indicating the abnormal end and the number of actually transmitted sheets to be displayed on the display unit 50. When the failure is eliminated, the coin rack management part 61 ends the exclusion of other services with respect to the image forming apparatus 20.

According to this embodiment, the following effects can be produced.

According to this embodiment, the management computer 41 determines a transmission condition based on the original material size and the character size entered by a user. The management computer 41 calculates a charge for facsimile transmission using the number of sheets of the original material and data on a charge per original material sheet obtained based on the original material size and the character size corresponding to the transmission condition. The management computer 41 determines whether to perform (or authorize execution of) facsimile transmission based on cash deposited in the coin rack 70 and the calculated charge for the facsimile transmission.

Therefore, in the case of performing facsimile transmission, it is possible to calculate a charge using the number of sheets of the original material to be faxed and the charge per original material sheet obtained based on the original material size and the character size. Accordingly, the charge can be calculated with flexible charge settings. Therefore, it is possible to calculate a charge more suitable for transmission status in the case of performing facsimile transmission. Further, since whether to perform (or authorize execution of) facsimile transmission is determined based on cash deposited in the coin rack 70 and the calculated charge, it is possible to prevent facsimile transmission from being performed when the charge cannot be collected.

According to this embodiment, the image forming apparatus 20 determines the state of change in the coin rack 70 and the state of cash deposited therein before performing facsimile transmission. Then, with respect to the case of interruption of the facsimile transmission, the image forming apparatus 20 calculates a charge corresponding to each possible number of sheets at the time of the interruption. Then, with respect to each possible number of sheets, the image forming apparatus 20 determines whether there is enough change at the time of the interruption of the facsimile transmission based on the calculated charge and cash usable for change in the coin rack 70. If there is not enough change, the image forming apparatus 20 prevents the facsimile transmission from being performed. This makes it possible to confirm in advance that there is enough change even if the facsimile transmission is interrupted. If a shortage of change may occur, it is possible to prevent the image forming apparatus 20 from performing the facsimile transmission until the shortage of change is eliminated. Accordingly, it is possible to prevent the shortage of change from occurring in the case of interruption of the facsimile transmission.

According to this embodiment, the management computer 41 compares an amount of money deposited in the coin rack 70 by a user and a calculated charge. Only if the amount of money deposited in the coin rack 70 by the user is greater than or equal to the calculated charge, the management computer 41 performs facsimile transmission. Accordingly, it is possible to prevent the facsimile transmission from being performed if cash corresponding to the calculated charge is not deposited in the coin rack 70 by the user. Accordingly, it is possible to prevent the occurrence of a case where the calculated charge cannot be collected.

According to this embodiment, the management computer 41 receives a transmission result report containing data on the number of actually transmitted sheets from the image processing unit part 20A, and calculates an actual amount to be deducted based on the number of actually transmitted sheets and a charge per unit sheet. Accordingly, it is possible to charge for facsimile transmission in accordance with the number of actually transmitted sheets.

According to this embodiment, the management computer 41 receives a transmission result report containing data on the number of actually transmitted sheets from the image processing unit part 20A, and calculates an actual amount to be deducted based on the number of actually transmitted sheets and a charge per original material sheet. Accordingly, it is possible to charge for facsimile transmission in accordance with the number of actually transmitted sheets.

According to this embodiment, data on a charge per original material sheet is extracted from the charge setting table storage part 67 based on a specified original material size and character size, so that a charge is calculated. Accordingly, it is possible to charge for facsimile transmission in accordance with a resolution corresponding to the original material size and the character size.

According to this embodiment, when facsimile transmission is completed, original material data stored in the HDD 33 or original material data recorded in the original data storage part 65 is deleted in step S4-9 (FIG. 8). Accordingly, it is possible to protect personal information in the image forming apparatus 20, which is used by a large number of unspecified users.

According to this embodiment, after transmitting a facsimile transmission job to the image processing unit part 20A, in step S4-2, the management computer 41 changes the display style of a destination number to "hidden display." As a result, it is possible to prevent others from having a secret look at the destination number.

According to this embodiment, the paper original material is read using the image reading unit 22, so that the electronic data of the original material to be transmitted is obtained. Then, by counting the number of sheets in reading the original material, the number of sheets of the original material to be faxed is obtained. Accordingly, it is possible to charge for facsimile transmission in accordance with the number of read sheets.

According to this embodiment, if the facsimile number of a destination of transmission is a special number, a charge is calculated using the basic charge and the charge per original material sheet of the corresponding special number data 664. Accordingly, it is possible to perform charging, setting charges flexibly in accordance with destinations.

According to this embodiment, the original material size is input by a user. Alternatively, the original material size may be obtained based on read data on the original material when the image reading unit 22 reads the original material. This makes it possible to further simplify user's input operations.

The above-described embodiment may be modified as follows.

[First Modification]

According to the above-described embodiment, facsimile transmission is performed using original material data generated by the image reading unit 22 optically reading paper original material. Alternatively, facsimile transmission may be performed reading and using the electronic data of original material created using software. In this case, the operations of steps S1-4 through S1-11 of FIG. 5 are replaced by the following operations.

Figure 10:
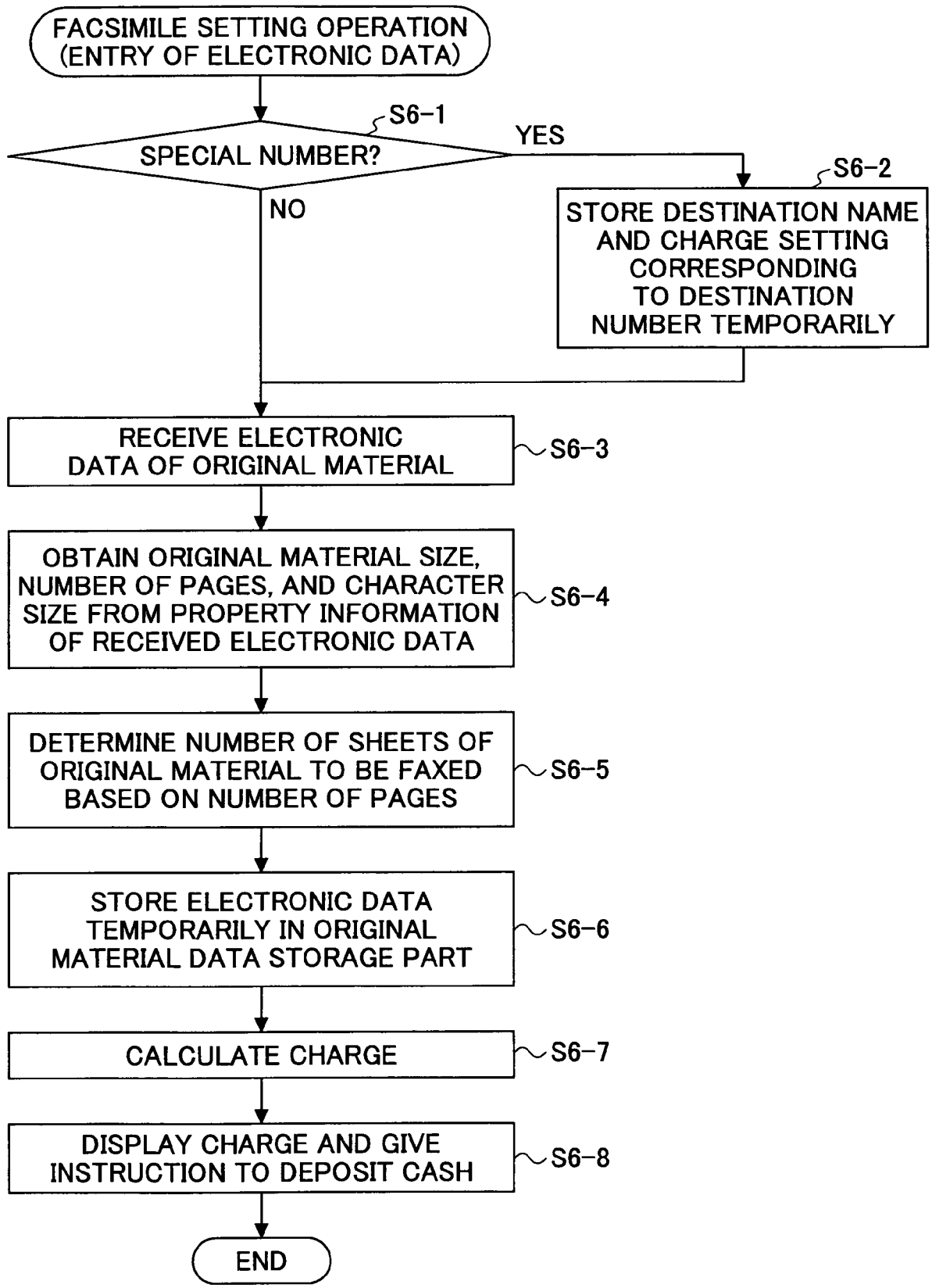
FIG. 10 is a flowchart for illustrating a facsimile setting operation (entry of electronic data) according to a first modification of the embodiment of the present invention.

FIG. 10 is a flowchart for illustrating a facsimile setting operation (entry of electronic data) according to a first modification of the above-described embodiment.

In this case, as illustrated in FIG. 10, if the destination number is not a special number (NO in step S6-1), the management computer 41 proceeds directly to the operation of step S6-3. In step S6-3, the management computer 41 receives the electronic data of the original material. Specifically, first, the user sets an electronic medium on which the electronic data of the original material is recorded in the external medium input/output unit 23. When the user selects reading of the electronic data of the original material (original material data) from the electronic medium on the display unit 50, a list of the original material data (original material files) recorded on the electronic medium is displayed on the display unit 50. The user performs an input operation to select the original material data to be faxed. As a result, the selected original material data is transmitted to the management computer 41. The management computer 41 receives the original material data.

Then, in step S6-4, the overall control part 60 of the management computer 41 obtains data on original material size, the number of pages, and character size set as the property information (attribute information) of the received original material data (original material file). The overall control part 60 reports the obtained data on original material size, the number of pages, and character size to the facsimile control part 62. In step S6-5, the facsimile control part 62 determines the number of sheets of the original material to be faxed based on the reported number of pages.

Next, in step S6-6, the overall control part 60 stores the received electronic data (original material data) temporarily in the original material data storage part 65. Then, the overall control part 60 notifies the facsimile control part 62 of the temporary storage of the original material (received electronic data).

In step S6-7, receiving this notification, the facsimile control part 62 calculates a charge. This calculation of a charge is performed in the same manner as in the case of step S1-10 (FIG. 5) of the above-described embodiment except that the number of sheets of the original material determined as described above is used. Specifically, if the destination number is not a special number, the charge setting data 670 is extracted based on the original material size and the character size, and a charge is calculated based on the charge per original material sheet of the extracted charge setting data 670 and the number of sheets of the original material determined as described above. Then, in step S6-8, the overall control part 60 causes the calculated charge to be displayed on the display unit 50, and gives an instruction to deposit the charged amount.

If the destination number is a special number (YES in step S6-1), in step S6-2, the management computer 41 temporarily stores a destination name and a charge setting corresponding to the destination number. In this case, in step S6-7, the special number data 664 is extracted based on the destination number (special number), and a charge is calculated using the basic charge and the charge per original material sheet of the extracted special number data 664. Specifically, the basic charge is added to the charge calculated using the determined number of sheets of the original material and the charge per original material sheet.

Thus, according to this modification, it is possible to calculate a charge even in the case of reading and faxing the electronic data of original material created using software. In this case, there is no need to read paper original material and convert the read paper original material into electronic data. Accordingly, it is possible to reduce smearing and unclearness of characters or letters. Further, in this case, by using the data on original material size, the number of pages, and character size obtained from the property information, it is possible to simplify user's input operations and thus improve user's convenience.

[Second Modification]

According to the above-described embodiment, if facsimile transmission ends abnormally, the image processing unit part 20A transmits a transmission result report containing information on the number of actually transmitted sheets to the information processing unit part 20B. The management computer 41 calculates an actual amount to be deducted using the information on the number of actually transmitted sheets contained in the transmission result report. Alternatively, the transmission result report from the image processing unit part 20A in the case where facsimile transmission ends abnormally may contain information on a communication period, and the actual amount to be deducted may be calculated based on the communication period. In this case, the management computer 41 may calculate the number of faxed sheets of the original material based on the communication period, and may calculate the actual amount to be deducted based on the calculated number of sheets of the original material. A description is given, with reference to FIGS. 11 and 12, of a specific operation in this case.

Figure 11:
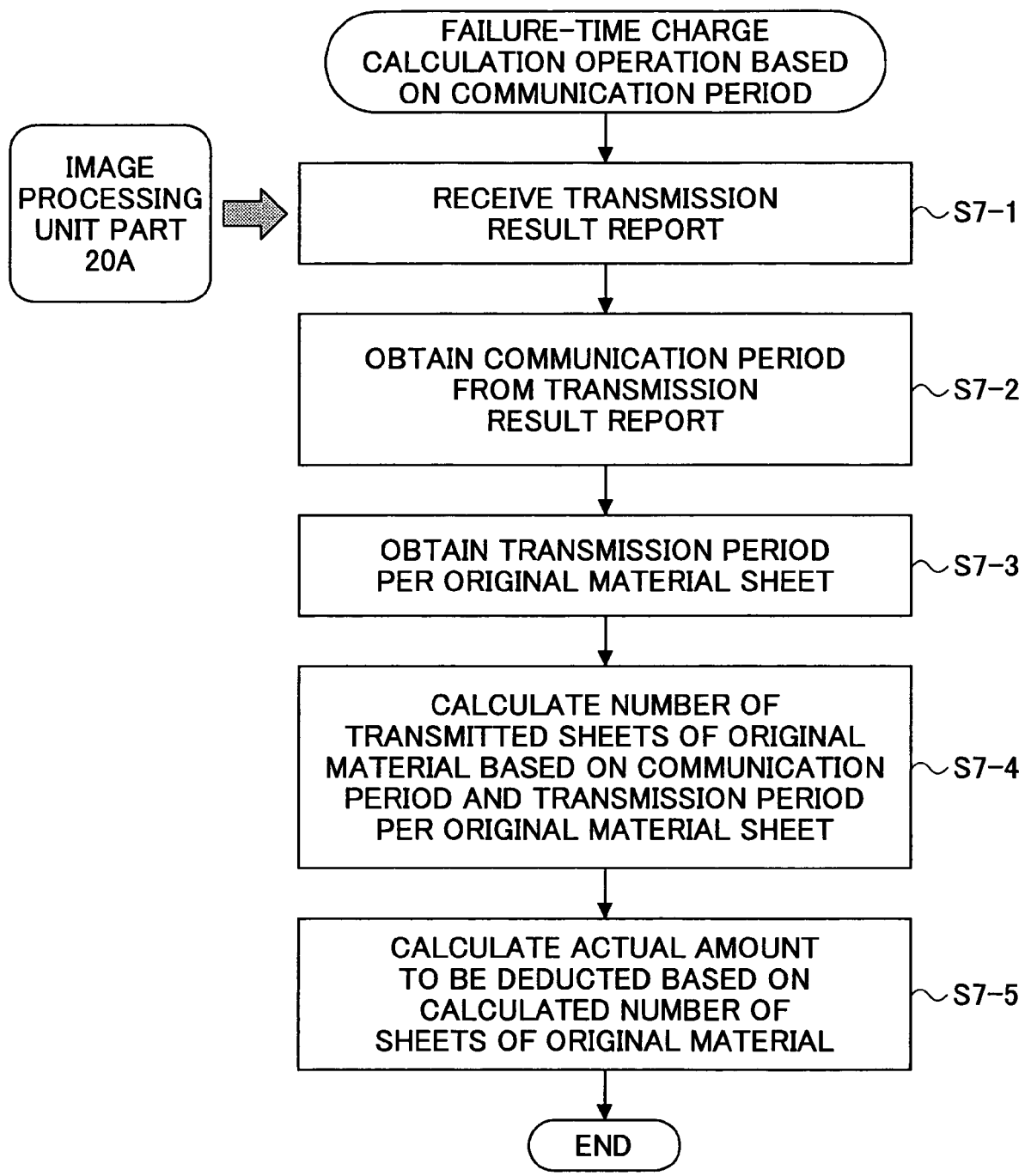
FIG. 11 is a flowchart for illustrating a failure-time charge calculation operation based on a communication period according to a second modification of the embodiment of the present invention.

FIG. 11 is a flowchart for illustrating a failure-time charge calculation operation based on a communication period according to a second modification of the above-described embodiment.

Figure 12:
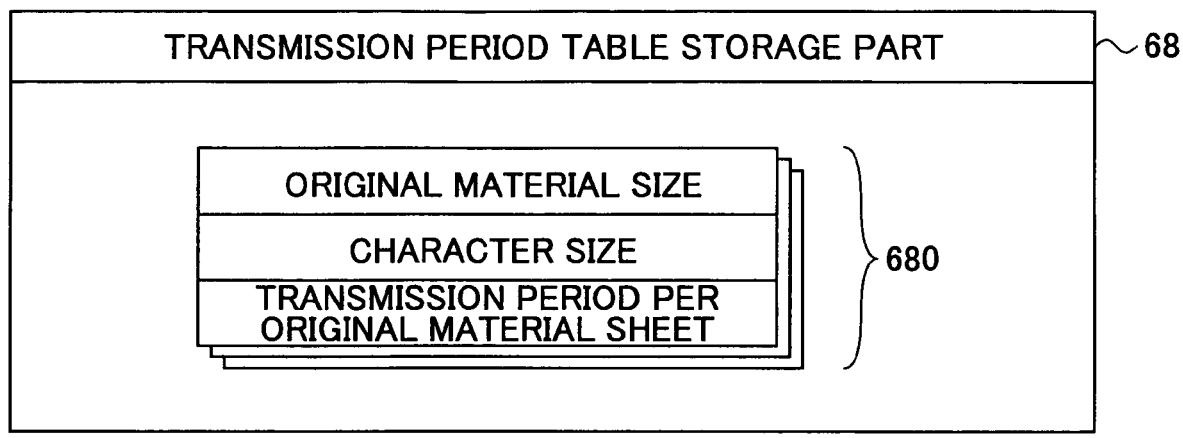
FIG. 12 is a diagram for illustrating data stored in a transmission period table storage part according to the second modification of the embodiment of the present invention.

In this case, a transmission period table storage part 68 illustrated in FIG. 12 may be provided in the storage unit 43. In the transmission period table storage part 68, transmission period tables formed of transmission period data 680 concerning a transmission period per original material sheet are recorded. The transmission period data 680 of each transmission period table includes data on original material size, character size, and a transmission period per original material sheet.

If facsimile transmission ends abnormally, in step S7-1 of FIG. 11, the management computer 41 receives a transmission result report indicating an abnormal end from the image processing unit part 20A. The transmission result report in this case includes data on a communication state indicating an abnormal end and data on a communication period.

In step S7-2, the facsimile control part 62 of the management computer 41 analyzes this transmission result report, and obtains the data on the communication period. Further, the facsimile control part 62 obtains a transmission period per original material sheet from the transmission period table storage part 68 using the temporarily stored original material size and character size.

Then, in step S7-4, the facsimile control part 62 calculates the number of actually transmitted sheets of the original material from the communication period obtained from the transmission result report and the transmission period per original material sheet. In step S7-5, the facsimile control part 62 calculates an actual amount to be deducted based on the calculated number of sheets of the original material. Specifically, first, the facsimile control part 62 extracts a charge per original material sheet from the charge setting table storage part 67 based on the temporarily stored original material size and character size. Then, the facsimile control part 62 calculates an actual amount to be deducted using the charge per original material sheet and the number of actually transmitted sheets. If the destination number is a special number, the facsimile control part 62 calculates an actual amount to be deducted using the basic charge and the charge per original material sheet of the corresponding special number data 664. Then, the facsimile control part 62 notifies the overall control part 60 of the calculated actual amount to be deducted.

By performing the operations of steps S5-4 through S5-6 (FIG. 9) of the above-described embodiment, the management computer 41 deducts the calculated actual amount to be deducted in the coin rack 70, and notifies the user of the abnormal end and the number of actually transmitted sheets.

According to this operation, it is possible to collect a charge corresponding to the number of transmitted sheets based on data on a communication period included in a transmission result report at a failure time. Further, the user is notified of the number of actually transmitted sheets. Accordingly, when the user transmits the untransmitted portion (sheets) of the original material, the user does not have to retransmit the transmitted sheets of the original material, which is economical.

[Third Modification]

According to the above-described embodiment, the special number data 664 is recorded, and if the destination number is a special number, a charge is calculated using the data on a basic charge and a charge per original material sheet of the corresponding special number data 664. An abbreviated number may be employed for a specific destination of transmission. In this case, by entering the abbreviated number, the facsimile number of the corresponding destination is specified as a destination number.

If a specific charge structure is employed for the destination, data on the charge structure may be stored, being correlated with the abbreviated number or the corresponding facsimile number, and a charge may be calculated using the charge structure.

Further, if the original material size and the character size are predetermined for the specific destination, data specifying the original material size and the character size may be recorded, and when the facsimile number of the destination is specified, its charge structure and its original material size and character size may be employed. In this case, the facsimile number of the destination may be specified by specifying the abbreviated number.

Figure 13:
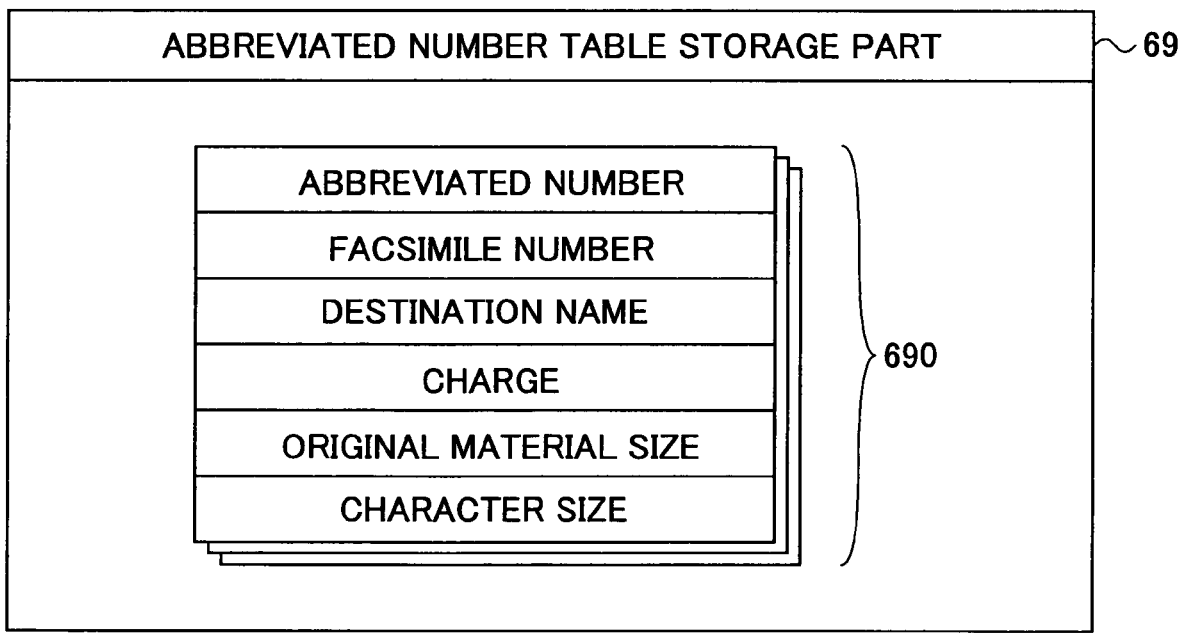
FIG. 13 is a diagram for illustrating data stored in an abbreviated number table storage part according to a third modification of the embodiment of the present invention.

For instance, an abbreviated number table storage part 69 illustrated in FIG. 13 may be provided in the storage part 43. In the abbreviated number table storage part 69, abbreviated number tables formed of abbreviated number data 690 of each abbreviated number are recorded. The abbreviated number data 690 of each abbreviated number table includes data on an abbreviated number, and a facsimile number, destination name, charge, original material size, and character size corresponding to the abbreviated number. Here, the charge data includes at least one of a basic charge and a charge per original material sheet.

When the user enters an abbreviated number, the management computer 41 extracts the abbreviated number data 690 from the abbreviated number table storage part 69 based on the entered abbreviated number. The management computer 41 calculates an amount to be collected using charge data included in the extracted abbreviated number data 690. Then, the management computer 41 specifies the original material size and the character size set in the extracted abbreviated number data 690, and causes the image processing unit part 20A to perform facsimile transmission with the specified original material size and character size.

By using an abbreviated number, it is possible to simplify user's input operations and thus improve user's convenience. Further, since the user's input operations are facilitated, it is possible to prevent a wrong destination from being entered. Further, since a preset original material size and character size are employed, it is possible to prevent a wrong original material size and character size from being entered.

It is also possible that either the charge data or the original material and character size data is stored in correlation with the abbreviated number or the facsimile number. If the charge data is not stored in correlation with the abbreviated number or the facsimile number, a charge is calculated in the same manner as in the normal case using the original material size and the character size stored in correlation with the abbreviated number or the facsimile number. This makes it possible to prevent a specific destination from being given special treatment with respect to charges even if the original material size and the character size are predetermined for the specific destination.

[Fourth Modification]

According to the above-described embodiment, the read sheets of the original material are faxed. Alternatively, the number of sheets to be transmitted may be reduced by performing a combining operation on the original material after reading the original material and converting the read original material into electronic data. The combining operation refers to the operation of combining two or more sheets of the original material onto a single sheet of the original material to be faxed. For instance, two sheets of the read original material are combined into a single sheet of the original material to be faxed. In the case of performing this combining operation on the original material, the user enters an instruction to perform a combining operation (a combining operation instruction) from the display unit 50. When the combining operation instruction is entered, the management computer 41 calculates a charge in the case of performing the combining operation in accordance with the combining operation instruction.

A description is given, with reference to FIG. 14, of an operation procedure in this case. FIG. 14 is a flowchart for illustrating the combining operation according to a fourth modification of the above-described embodiment. The combining operation instruction may be given either before or after reading the original material. Here, a description is given of a case where the combining operation instruction is given after reading the original material. Specifically, the following operation is performed after the operation of step S1-9 of FIG. 5.

In step S8-1 of FIG. 14, the management computer 41 receives a combining operation instruction by the user. Specifically, first, the overall control part 60 of the management computer 41 causes a display screen prompting selection of "N-up" as a combining operation instruction to be displayed on the display unit 50. On this display screen, the user gives a combining operation instruction by determining whether to select "N-up" and selecting a layout in the case of selecting "N-up." When the combining operation instruction is thus given by the user (the combining operation is selected by the user), data on the combining operation instruction is transmitted to the management computer 41.

In step S8-2, the facsimile control part 62 of the management computer 41 resets the number of sheets of the original material based on the combining operation instruction. For instance, in the case where a combination layout that disposes two sheets of the entered (read) original material on a single sheet of the original material to be faxed is selected, if the number of sheets of the entered original material is five, the number of sheets of the original material to be faxed is three.

Then, in step S8-3, the facsimile control part 62 calculates a charge based on the reset number of sheets of the original material (the number of sheets of the original material to be faxed), the original material size, and the character size. The overall control part 60 of the management computer 41 causes the charge to be displayed on the display unit 50, and gives an instruction to deposit the charged amount. Then, the overall control part 60 performs the change check operation (FIG. 6) and the pre-transmission charging confirmation operation (FIG. 7) using the reset number of sheets of the original material after the combining operation.

Then, as an operation corresponding to step S4-1 of the facsimile transmission operation (FIG. 8), the management computer 41 transmits the original material data subjected to the combining operation (the combined original material data) to the image processing unit part 20A, and performs the facsimile transmission operation. Specifically, first, in step S8-4, the facsimile control part 62 creates the combined original material data in accordance with the combining operation instruction based on the original material data stored temporarily in the original material data storage part 65. Then, in step S8-5, the facsimile control part 62 sends the combined original material data and the destination number to the image processing unit part 20A. Based on the combined original material data and the destination number, the image processing unit part 20A faxes the original material data to be transmitted subjected to the combining operation. If the original material data is contained in the image processing unit part 20A (the original material is converted into electronic data in the image reading unit 22), the overall control part 60 requests the original material data from the image processing control unit 30 through the LAN control part 55, and stores the obtained original material data temporarily in the original material data storage part 65.

The subsequent operation of creating the combined original material data is the same as described above. If the original material data is contained in both the image processing unit part 20A and the information processing unit part 20B, the original material data is deleted using random data in both the image processing unit part 20A and the information processing unit part 20B.

In both the facsimile transmission operation (FIG. 8) and the failure-time charging operation (FIG. 9), the number of sheets of the original material after the combining operation is employed to calculate an amount to be deducted.

Thus, the user can combine and fax the sheets of the original material if the user wishes. Accordingly, it is possible to reduce the number of sheets to be transmitted. In this case, charging is performed based on the number of transmitted sheets after the combining operation. Accordingly, the user can save money.

[Fifth Modification]

According to the above-described embodiment, the communication result of facsimile transmission is displayed on the display unit 50. The communication result may be presented to the user by printing out a report on the communication result. In this case, the communication result is printed out using the printing unit 21 of the image processing unit part 20A.

This enables the user to check the communication result of facsimile transmission later using this report on the communication result. This eliminates the necessity of verifying the communication result of facsimile transmission by each user by leaving communication results in the image forming apparatus 20. Thus, it is not necessary to store the communication results in the image forming apparatus 20. Accordingly, in the case of using the image forming apparatus 20, which is used by a large number of unspecified users, it is possible to protect personal information by not leaving behind information on destinations of transmissions.

[Sixth Modification]

According to the above-described embodiment, a charge is calculated in accordance with the original material size, the character size, and the number of sheets to be transmitted (or transmitted sheets), using the charge setting data 670 providing a charge per original material sheet corresponding to the original material size and the character size. The charge may be calculated based on the destination number (the facsimile number of a destination of transmission). In this case, the area code of the destination number may be employed. With respect to each area code, a charge per original material sheet may be determined in correspondence to a distance obtained based on the area code of the transmission end and the area code of the destination.

For instance, charge setting tables formed of charge setting data in which a charge per original material sheet is recorded, being correlated with the corresponding original material size, character size, and destination area code, are recorded in the charge setting table storage part 67. A charge per original material sheet may be obtained based on the original material size, character size, and destination area code, and a charge may be calculated based on the charge per original material sheet and the number of sheets to be transmitted (or the number of transmitted sheets). This makes it possible to set charges more flexibly, so that it is possible to perform charging more suitably for transmission status in the case of performing facsimile transmission.

[Seventh Modification]

According to the above-described embodiment, the charge per original material sheet corresponding to the original material size and the character size is set as a flat rate. Alternatively, a charge according to a communication period may be set. In this case, a charge per unit sheet is set in accordance with a communication period per unit sheet that differs between destinations of transmission. In this case, the communication period per unit sheet may be set on a destination facsimile machine (the facsimile machine of a destination of transmission) basis.

For instance, an original material size, a character size, a communication period per original material sheet, and a charge per original material sheet are recorded in a charge setting table. Then, using the original material size, character size, and communication period per original material sheet, the charge per original material sheet is obtained. The communication period per original material sheet is obtained, for instance, on a destination facsimile machine basis. This makes it possible to set charges more flexibly, so that it is possible to perform charging more suitably for transmission status in the case of performing facsimile transmission.

[Eighth Modification]

According to the above-described embodiment, when facsimile transmission ends normally, an amount to be charged is calculated in step S4-5 (FIG. 8) using the number of actually transmitted sheets. Alternatively, the charge calculated in step S1-10 (FIG. 5) may be stored, and this charge may be determined as an amount to be charged when facsimile transmission ends normally. Further, the number of actually transmitted sheets may be collated with the number of read sheets of the original material counted in step S1-8 (FIG. 5), and the charge calculated in step S1-10 may be determined as an amount to be charged if the numbers match. As a result, the operation can be simplified because there is no need to recalculate the amount to be charged when facsimile transmission ends normally.

[Ninth Modification]

According to the above-described embodiment, a charge per original material sheet is recorded in the charge setting table storage part 67. Alternatively, a specified number of sheets may be determined as unit quantity, and a charge per unit quantity may be recorded in the charge setting table storage part 67. As a result, charges can be set flexibly but not in too much detail. The unit quantity may be data quantity. This makes it possible to perform charging in accordance with data quantity.

Technical ideas understood from the above-described embodiment and modifications are described as follows together with their effects.

(a) A charging method wherein, in the case of charging for use of a facsimile machine using an information processing unit provided in the facsimile machine and a cash storage part storing cash deposited by a user, the information processing unit obtains the amount of facsimile transmission, obtains a transmission condition, calculates a charge for the facsimile transmission using the amount of facsimile transmission and a charge corresponding to the transmission condition, and determines whether to perform (or authorize execution of) the facsimile transmission based on the cash deposited in the cash storage part and the calculated charge for the facsimile transmission, the information processing unit storing data on the charge corresponding to the transmission condition for the facsimile transmission; and a charging apparatus, a facsimile machine, or a program for realizing the charging method.

According to the invention described above in (a), it is possible to calculate a charge for facsimile transmission using the obtained amount of facsimile transmission and a charge corresponding to a transmission condition specified by a user. Therefore, it is possible to calculate a charge with more flexible charge settings, and it is possible to calculate a charge more suitable for usage in the case of performing facsimile transmission. Further, whether to perform (or authorize execution of) facsimile transmission is determined based on cash deposited in a cash storage part and the calculated charge. Accordingly, it is possible to prevent facsimile transmission from being executed when the charge cannot be collected.

The transmission condition may be specified by the user.

(b) The charging method, and the charging apparatus, the facsimile machine, or the program as described in (a), wherein the information processing unit performs an operation for checking cash for change stored in the cash storage part, performs an operation for checking the amount of money deposited in the cash storage part by the user, calculates a charge at each stage of the facsimile transmission in advance, determines with respect to each stage whether it is possible to return change corresponding to an amount obtained by deducting the calculated charge from the deposited amount of money using the cash for change, and prevents the facsimile transmission from being executed if the change cannot be returned at any stage of the facsimile transmission.

According to the invention described above in (b), it is possible to confirm in advance that change can be returned in any case even if facsimile transmission is interrupted. It is possible to prevent facsimile transmission from being performed if change cannot be returned in any case. Accordingly, it is possible to prevent the occurrence of a situation where change cannot be returned at the time of interruption of facsimile transmission.

(c) The charging method, and the charging apparatus, the facsimile machine, or the program as described in (a) or (b), wherein the information processing unit reads and obtains the electronic data of original material to be transmitted, obtains the amount of facsimile transmission based on the attribute information of the electronic data, and determines the transmission condition based on the attribute information.

According to the invention described above in (c), it is possible to charge for facsimile transmission based on the amount of facsimile transmission obtained from the attribute information of the electronic data of original material. Further, it is possible to simplify user's operations and improve user's convenience by determining the transmission condition based on the attribute information.

(d) The charging method, and the charging apparatus, the facsimile machine, or the program as described in one of (a) through (c), wherein the information processing unit receives an instruction to combine the sheets of the original material to be faxed, calculates the number of "combined" sheets of the original material after the combining operation, and obtains the amount of facsimile transmission based on the number of "combined" sheets.

According to the invention described above in (d), in the case of combining the sheets of the original material and transmitting the original material subjected to the combining operation, it is possible to charge for facsimile transmission in accordance with the number of "combined" sheets of the original material subjected to the combining operation. In this case, for instance, the user gives a combining operation instruction by selecting "N-up," and a computer disposes the sheets of the original material in a combination layout selected in correspondence to "N-up," and faxes the "combined" sheets of the original material. In this case, the facsimile transmission is charged for in accordance with the number of sheets of the original material after the combining operation. Accordingly, the user can save on charges by selecting a combining operation.

(e) The charging method, and the charging apparatus, the facsimile machine, or the program as described in one of (a) through (d), wherein the information processing unit determines the transmission condition based on at least one of original material size, resolution, destination facsimile machine, destination number (destination facsimile number), and communication period.

According to the invention described above in (e), charges can be set flexibly in accordance with at least one of original material size, resolution, destination facsimile machine, destination number (destination facsimile number), and communication period. Accordingly, it is possible to calculate a charge more suitable for usage in the case of performing facsimile transmission.

The present invention is not limited to the specifically disclosed embodiments, and variations and modifications may be made without departing from the scope of the present invention.

The present application is based on Japanese Priority Patent Application No. 2004-079278, filed on Mar. 18, 2004, the entire contents of which are hereby incorporated by reference.

What is claimed is:

1. A method of charging for use of a facsimile apparatus, using an information processing unit provided therein, the method comprising the steps of:
   (a) the information processing unit obtaining a number of sheets of a multi-sheet document to be transmitted by facsimile transmission;
   (b) the information processing unit obtaining a transmission condition specified by a user;
   (c) the information processing unit calculating a charge for the facsimile transmission of the document using the obtained number of sheets of the document and a charge corresponding to the transmission condition;
   (d) the information processing unit calculating a charge for facsimile transmission of each of one or more numbers of sheets less than the obtained number of sheets using each of the one or more numbers of sheets and the charge corresponding to the transmission condition;
   (e) the information processing unit determining whether there is enough change, based on stored cash and user deposited cash, with respect to each of the charges calculated with respect to the obtained number of sheets and the one or more numbers of sheets; and
   (f) the information processing unit determining whether to authorize the facsimile transmission of the document based on a result of the determination of step (e),
   wherein the information processing unit stores data on the charge corresponding to the transmission condition for the facsimile transmission.

2. The method as claimed in claim 1, wherein the information processing unit obtains a transmission status based on a transmission result report from the facsimile apparatus, and calculates the charge for the facsimile transmission using the charge corresponding to the transmission condition based on the transmission status.

3. An apparatus for charging for use of a facsimile apparatus, the apparatus comprising:
   an information processing unit,
   the information processing unit including:
   a transmission amount obtaining part configured to obtain a number of sheets of a multi-sheet document to be transmitted by facsimile transmission;
   a transmission condition obtaining part configured to obtain a transmission condition specified by a user;
   a charge storage part configured to store data on a first charge corresponding to the transmission condition for the facsimile transmission;
   a charge calculation part configured to calculate a second charge for the facsimile transmission of the document using the obtained number of sheets of the document and the first charge corresponding to the transmission condition, the first charge being extracted from the charge storage part based on the transmission condition, and to calculate a third charge for facsimile transmission of each of one or more numbers of sheets less than the obtained number of sheets using each of the one or more numbers of sheets and the charge corresponding to the transmission condition;
   a charge determination part configured to determine whether there is enough change, based on stored cash and user deposited cash, with respect to each of the second and third charges calculated with respect to the obtained number of sheets and the one or more numbers of sheets; and
   a facsimile transmission authorization part configured to determine whether to authorize the facsimile transmission of the document based on a result of the determination of the charge determination part.

4. The apparatus as claimed in claim 3, wherein the information processing unit further comprises:
   a calculation part configured to obtain a transmission status based on a transmission result report from the facsimile apparatus, and calculate the second charge for the facsimile transmission using the first charge corresponding to the transmission condition based on the transmission status.

5. The apparatus as claimed in claim 3, wherein the information processing unit is provided in the facsimile apparatus.

6. A computer-readable storage medium storing a program for causing a computer to execute a method of charging for use of a facsimile apparatus, the method comprising the steps of:
   (a) obtaining a number of sheets of a multi-sheet document to be transmitted by facsimile transmission;
   (b) obtaining a transmission condition specified by a user;
   (c) calculating a charge for the facsimile transmission of the document using the obtained number of sheets of the document and a charge corresponding to the transmission condition;
   (d) calculating a charge for facsimile transmission of each of one or more numbers of sheets less than the obtained number of sheets using each of the one or more numbers of sheets and the charge corresponding to the transmission condition;
   (e) determining whether there is enough change, based on stored cash and user deposited cash, with respect to each of the charges calculated with respect to the obtained number of sheets and the one or more numbers of sheets; and
   (f) determining whether to authorize the facsimile transmission of the document based on a result of the determination of step (e),
   and storing data on the charge corresponding to the transmission condition for the facsimile transmission.

* * * * *